US012793636B2

(12) United States Patent
Lee et al.

(10) Patent No.: US 12,793,636 B2
(45) Date of Patent: Nov. 10, 2026

(54) PIXEL CIRCUIT AND ELECTRONIC APPARATUS INCLUDING THE SAME

(71) Applicant: Samsung Display Co., LTD., Yongin-si (KR)

(72) Inventors: Sehyun Lee, Yongin-si (KR); Kwihyun Kim, Yongin-si (KR); Dongwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/035,153

(22) Filed: Jan. 23, 2025

(65) Prior Publication Data

US 2025/0336354 A1 Oct. 30, 2025

(30) Foreign Application Priority Data

Apr. 30, 2024 (KR) ........................ 10-2024-0057941

(51) Int. Cl.
*G09G 3/3233* (2016.01)
*G09G 3/3225* (2016.01)
*H05B 45/325* (2020.01)

(52) U.S. Cl.
CPC ......... *G09G 3/3233* (2013.01); *G09G 3/3225* (2013.01); *H05B 45/325* (2020.01); (Continued)

(58) Field of Classification Search
CPC ...... G09G 3/32; G09G 3/3225; G09G 3/3233; G09G 2300/043; G09G 2300/0439; (Continued)

(56) References Cited

U.S. PATENT DOCUMENTS

2023/0078842 A1* 3/2023 Kim .......................... G09G 3/32 257/443
2023/0119036 A1* 4/2023 Hwang ................ G09G 3/2081 345/204

(Continued)

FOREIGN PATENT DOCUMENTS

KR 10-1950819 4/2019
KR 10-2022-0052265 4/2022

(Continued)

OTHER PUBLICATIONS

Richter et al., "OLED-on-CMOS based bidirectional microdisplay for near-to-eye and sensor applications," IEEE, 2011, 3 pages.

*Primary Examiner* — Julie Anne Watko
(74) *Attorney, Agent, or Firm* — Womble Bond Dickinson (US) LLP

(57) ABSTRACT

A pixel circuit includes: a first transistor including a control electrode connected to a first node, a first electrode connected to a second node, and a second electrode connected to a third node; a second transistor configured to apply a data voltage to the first transistor; a third transistor connected to the first node and the third node; a seventh transistor connected to a fourth node and configured to apply a driving current to a light emitting element; a ninth transistor configured to apply a constant-current voltage to the fourth node; a third capacitor including a first electrode connected to the fourth node and a second electrode connected to an anode electrode of the light emitting element; and the light emitting element configured to emit a light based on the data voltage and the constant-current voltage.

20 Claims, 25 Drawing Sheets

(52) U.S. Cl.
CPC ................. *G09G 2300/043* (2013.01); *G09G 2300/0439* (2013.01); *G09G 2300/0819* (2013.01); *G09G 2300/0852* (2013.01); *G09G 2300/0861* (2013.01); *G09G 2310/061* (2013.01); *G09G 2310/08* (2013.01); *G09G 2320/02* (2013.01); *G09G 2320/0238* (2013.01); *G09G 2330/021* (2013.01)

(58) Field of Classification Search
CPC ... G09G 2300/0819; G09G 2300/0852; G09G 2300/0861; G09G 2310/0267; G09G 2310/061; G09G 2310/08; G09G 2320/02; G09G 2320/0238; G09G 2330/021; H05B 45/325; H10D 30/67
See application file for complete search history.

(56) References Cited

U.S. PATENT DOCUMENTS

| | | | | |
|---|---|---|---|---|
| 2023/0145269 | A1* | 5/2023 | Oh | G09G 3/20 345/690 |
| 2023/0402007 | A1* | 12/2023 | Chae | G09G 3/3233 |
| 2025/0124854 | A1* | 4/2025 | Kim | G09G 3/32 |
| 2025/0252915 | A1* | 8/2025 | Park | G09G 3/3233 |
| 2025/0322784 | A1* | 10/2025 | Kim | G09G 3/32 |
| 2025/0336338 | A1* | 10/2025 | Kim | G09G 3/2081 |
| 2025/0342804 | A1* | 11/2025 | Kim | G09G 3/3233 |

FOREIGN PATENT DOCUMENTS

| | | |
|---|---|---|
| KR | 10-2023-0011844 | 1/2023 |
| KR | 10-2024-0156485 | 10/2024 |

* cited by examiner

PIXEL CIRCUIT AND ELECTRONIC APPARATUS INCLUDING THE SAME

CROSS-REFERENCE TO RELATED APPLICATION

The present application claims priority to and the benefit of Korean Patent Application No. 10-2024-0057941, filed on Apr. 30, 2024, in the Korean Intellectual Property Office, the entire disclosure of which is incorporated herein by reference.

BACKGROUND

1. Field

Aspects of some embodiments of the present disclosure relate to a pixel circuit and an electronic apparatus including the pixel circuit.

2. Description of the Related Art

Generally, a display apparatus includes a display panel and a display panel driver. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

A pixel circuit may be driven in a pulse width modulation method and operating internal compensation of the threshold voltage may include nineteen or more transistors and three or more capacitors. When the pixel circuit includes nineteen or more transistors and three or more capacitors, the pixel circuit may not be applied to an ultra-high resolution display apparatus due to a limitation in integration.

The above information disclosed in this Background section is only for enhancement of understanding of the background and therefore the information discussed in this Background section does not necessarily constitute prior art.

SUMMARY

Aspects of some embodiments of the present disclosure relate to a pixel circuit and an electronic apparatus including the pixel circuit. For example, aspects of some embodiments of the present disclosure relate to a pixel circuit driven in a pulse width modulation method, operating an internal compensation of a threshold voltage, including fewer transistors, and thus, applicable to a ultra-high resolution display apparatus and an electronic apparatus including the pixel circuit.

Aspects of some embodiments of the present disclosure include a pixel circuit driven in a pulse width modulation method, operating an internal compensation of a threshold voltage, including fewer transistors, and thus, applicable to a ultra-high resolution display apparatus.

Aspects of some embodiments of the present disclosure also include a display apparatus including the pixel circuit.

In a pixel circuit according to some embodiments of the present disclosure, the pixel circuit includes a first transistor, a second transistor, a third transistor, a seventh transistor, a ninth transistor, a third capacitor and a light emitting element. According to some embodiments, the first transistor includes a control electrode connected to a first node, a first electrode connected to a second node and a second electrode connected to a third node. According to some embodiments, the second transistor is configured to apply a data voltage to the first transistor. According to some embodiments, the third transistor is connected to the first node and the third node. According to some embodiments, the seventh transistor is connected to a fourth node and configured to apply a driving current to the light emitting element. According to some embodiments, the ninth transistor is configured to apply a constant-current voltage to the fourth node. According to some embodiments, the third capacitor includes a first electrode connected to the fourth node and a second electrode connected to an anode electrode of the light emitting element. According to some embodiments, the light emitting element is configured to emit a light based on the data voltage and the constant-current voltage.

According to some embodiments, the pixel circuit may further include a second capacitor including a first electrode connected to a first electrode of the seventh transistor and a second electrode connected to the fourth node.

According to some embodiments, the pixel circuit may further include a sixth transistor including a control electrode configured to receive a first initialization signal, a first electrode connected to the first node and a second electrode connected to a first initialization voltage terminal. According to some embodiments, the second electrode of the sixth transistor may be connected to a second electrode of the ninth transistor.

According to some embodiments, the pixel circuit may further include a first capacitor including a first electrode configured to receive a sweep signal and a second electrode connected to the first node.

According to some embodiments, the pixel circuit may further include a tenth transistor including a control electrode configured to receive a second initialization signal, a first electrode connected to the anode electrode of the light emitting element and a second electrode configured to receive a second initialization voltage.

According to some embodiments, the pixel circuit may further include an eighth transistor including a control electrode configured to receive an emission signal, a first electrode configured to receive a second power voltage and a second electrode connected to a first electrode of the seventh transistor.

According to some embodiments, the pixel circuit may further include a fourth transistor including a control electrode configured to receive an emission signal, a first electrode configured to receive a first power voltage and a second electrode connected to the second node and a fifth transistor including a control electrode configured to receive the emission signal, a first electrode connected to the third node and a second electrode connected to the fourth node.

According to some embodiments, the second transistor may include a control electrode configured to receive a first scan signal, a first electrode configured to receive the data voltage and a second electrode connected to the second node. According to some embodiments, the third transistor may include a control electrode configured to receive the first scan signal, a first electrode connected to the first node and a second electrode connected to the third node. According to some embodiments, the seventh transistor may include a control electrode connected to the fourth node, a first electrode connected to a fifth node and a second electrode connected to the anode electrode of the light emitting element. According to some embodiments, the ninth transistor may include a control electrode configured to receive a second scan signal, a first electrode connected to the fourth node and a second electrode connected to a first initialization voltage terminal. According to some embodiments, the light emitting element may include the anode electrode and a cathode electrode configured to receive a third power voltage. According to some embodiments, the pixel circuit may further include a fourth transistor including a control electrode configured to receive an emission signal, a first electrode configured to receive a first power voltage and a second electrode connected to the second node, a fifth transistor including a control electrode configured to receive the emission signal, a first electrode connected to the third node and a second electrode connected to the fourth node, a sixth transistor including a control electrode configured to receive a first initialization signal, a first electrode connected to the first node and a second electrode connected to the first initialization voltage terminal, an eighth transistor including a control electrode configured to receive the emission signal, a first electrode configured to receive a second power voltage and a second electrode connected to the fifth node, a tenth transistor including a control electrode configured to receive a second initialization signal, a first electrode connected to the anode electrode of the light emitting element and a second electrode configured to receive a second initialization voltage, a first capacitor including a first electrode configured to receive a sweep signal and a second electrode connected to the first node and a second capacitor including a first electrode connected to the fifth node and a second electrode connected to the fourth node.

According to some embodiments, the second transistor, the third transistor, the sixth transistor and the ninth transistor may be N-type transistors. According to some embodiments, the first transistor, the fourth transistor, the fifth transistor, the seventh transistor, the eighth transistor and the tenth transistor may be P-type transistors.

According to some embodiments, the first transistor may further include a second control electrode configured to receive the first power voltage. According to some embodiments, the second transistor may further include a second control electrode connected to the control electrode of the second transistor. According to some embodiments, the third transistor may further include a second control electrode connected to the control electrode of the third transistor. According to some embodiments, the sixth transistor may further include a second control electrode connected to the control electrode of the sixth transistor. According to some embodiments, the seventh transistor may further include a second control electrode configured to receive the second power voltage. According to some embodiments, the ninth transistor may further include a second control electrode connected to the control electrode of the ninth transistor.

According to some embodiments, the first initialization signal may have an active level in a first period. According to some embodiments, the second initialization signal may have an active level in the first period. According to some embodiments, the first scan signal may have an inactive level in the first period. According to some embodiments, the second scan signal may have an active level in the first period. According to some embodiments, the emission signal may have an inactive level in the first period. According to some embodiments, the sweep signal may have a high level in the first period. According to some embodiments, a voltage outputted from the first initialization voltage terminal may have a first level in the first period.

According to some embodiments, the first initialization signal may have an inactive level in a second period. According to some embodiments, the second initialization signal may have an active level in the second period. According to some embodiments, the first scan signal may have an active pulse in the second period. According to some embodiments, the second scan signal may have an active level in the second period. According to some embodiments, the emission signal may have an inactive level in the second period. According to some embodiments, the sweep signal may have a high level in the second period.

According to some embodiments, the first initialization signal may have an inactive level in a third period. According to some embodiments, the second initialization signal may have an active level in the third period. According to some embodiments, the first scan signal may have an inactive level in the third period. According to some embodiments, the second scan signal may have an active level in the third period. According to some embodiments, the emission signal may have an inactive level in the third period. According to some embodiments, the sweep signal may have a high level in the third period. According to some embodiments, a voltage outputted from the first initialization voltage terminal may have a second level in the third period.

According to some embodiments, the first initialization signal may have an inactive level in a fourth period and a fifth period. According to some embodiments, the second initialization signal may have an inactive level in the fourth period and the fifth period. According to some embodiments, the first scan signal may have an inactive level in the fourth period and the fifth period. According to some embodiments, the second scan signal may have an inactive level in the fourth period and the fifth period. According to some embodiments, the emission signal may have an active level in the fourth period and the fifth period. According to some embodiments, the sweep signal is configured to gradually decrease from a high level in the fourth period and the fifth period.

According to some embodiments, the second scan signal may have an inactive level in a first period. According to some embodiments, the second scan signal may have the inactive level in a second period subsequent to the first period. According to some embodiments, the second scan signal may have an active level in a third period subsequent to the second period.

According to some embodiments, the second scan signal may have an active level in a first period. According to some embodiments, the second scan signal may have an inactive level in a second period subsequent to the first period. According to some embodiments, the second scan signal may have the active level in a third period subsequent to the second period.

According to some embodiments, the data voltage may be applied to the first transistor and the light emitting element emits a light in a writing frame. According to some embodiments, the first initialization signal may have an active level in a first period of the writing frame. According to some embodiments, the first scan signal may have an active pulse in a second period of the writing frame. According to some embodiments, the data voltage may not be applied to the first transistor and the light emitting element emits a light in a holding frame. According to some embodiments, the first initialization signal may have an inactive level in a first period of the holding frame. According to some embodiments, the first scan signal may have an inactive level in a second period of the holding frame.

According to some embodiments, the first initialization signal, the second initialization signal, the first scan signal, the second scan signal, the emission signal and the sweep signal may be progressively applied to pixel rows.

In a pixel circuit according to some embodiments of the present disclosure, the pixel circuit includes a light emitting element, a first transistor including a gate, a first terminal, and a second terminal, a second transistor including a gate configured to receive a first writing signal, a first terminal connected to a first data line, and a second terminal connected to the first terminal of the first transistor, a third transistor including a gate configured to receive a first emission signal, a first terminal connected to a line configured to transfer a reference voltage, and a second terminal connected to the first terminal of the first transistor, a fourth transistor including a gate configured to receive a third writing signal, a first terminal connected to the second terminal of the first transistor, and a second terminal connected to the gate of the first transistor, a first capacitor including a first electrode connected to a line configured to transfer a sweep voltage, and a second electrode connected to the gate of the first transistor, a fifth transistor including a gate configured to receive a first initialization signal, a first terminal connected to a line configured to transfer an initialization voltage, and a second terminal connected to the gate of the first transistor, a sixth transistor including a gate configured to receive a second initialization signal, a first terminal connected to a line configured to transfer an anode initialization voltage, and a second terminal connected to an anode of the light emitting element, a seventh transistor including a gate, a first terminal, and a second terminal, an eighth transistor including a gate configured to receive a second writing signal, a first terminal connected to a second data line, and a second terminal connected to the first terminal of the seventh transistor, a ninth transistor including a gate configured to receive the first emission signal, a first terminal connected to a line configured to transfer a power supply voltage, and a second terminal connected to the first terminal of the seventh transistor, a third capacitor including a first electrode connected to the gate of the seventh transistor and a second electrode connected to the second terminal of the seventh transistor, a second capacitor including a first electrode connected to the line configured to transfer the power supply voltage, and a second electrode connected to the gate of the seventh transistor, an eleventh transistor including a gate configured to receive the first emission signal, a first terminal connected to the second terminal of the seventh transistor, and a second terminal connected to the anode of the light emitting element and a twelfth transistor including a gate configured to receive a second emission signal, a first terminal connected to the second terminal of the first transistor, and a second terminal connected to the gate of the seventh transistor.

In a pixel circuit according to some embodiments of the present disclosure, the pixel circuit includes a light emitting element including a first electrode and a second electrode connected to a low power line configured to transmit a low power voltage, a pulse width modulator configured to control an emission time of the light emitting element based on a data voltage and a constant current generator configured to provide a driving current having a constant level to the light emitting element based on a constant current generation voltage. According to some embodiments, the pulse width modulator may include a first driving transistor including a gate electrode connected to a first node, a first electrode connected to a second node and a second electrode connected to a third node. According to some embodiments, the constant current generator may include a second driving transistor including a gate electrode connected to a fourth node, a first electrode connected to a fifth node and a second electrode connected to a sixth node. According to some embodiments, the pulse width modulator may further include a first writing transistor including a gate electrode configured to receive a scan signal, a first electrode connected to a data line configured to transmit the data voltage and a second electrode connected to the second node, a first compensation transistor including a gate electrode configured to receive the scan signal, a first electrode connected to the third node and a second electrode connected to the first node, a first emission control transistor including a gate electrode configured to receive an emission control signal, a first electrode configured to receive a first high power voltage and a second electrode connected to the second node, a second emission control transistor including a gate electrode configured to receive the emission control signal, a first electrode connected to the third node and a second electrode connected to the fourth node, a first initialization transistor including a gate electrode configured to receive a first initialization gate signal, a first electrode configured to receive a first initialization voltage and a second electrode connected to the first node and a first capacitor including a first electrode configured to receive a sweep signal and a second electrode connected to the first node. According to some embodiments, the constant current generator may further include a second writing transistor including a gate electrode configured to receive a constant current generation scan signal, a first electrode connected to the data line configured to transmit the constant current generation voltage and a second electrode connected to the fifth node, a third capacitor including a first electrode connected to the fourth node and a second electrode connected to the sixth node, a third emission control transistor including a gate electrode configured to receive the emission control signal, a first electrode configured to receive a second high power voltage and a second electrode connected to the fifth node, a fourth emission control transistor including a gate electrode configured to receive the emission control signal, a first electrode connected to the sixth node and a second electrode connected to the first electrode of the light emitting element, a second initialization transistor including a gate electrode configured to receive a second initialization gate signal, a first electrode configured to receive the first initialization voltage and a second electrode connected to the fourth node, a bypass transistor including a gate electrode configured to receive a bypass gate signal, a first electrode connected to a second initialization voltage line configured to transmit a second initialization voltage and a second electrode connected to the first electrode of the light emitting element and a second capacitor including a first electrode configured to receive the second high power voltage and a second electrode connected to the fourth node.

In an electronic apparatus according to some embodiments of the present disclosure, the electronic apparatus includes a display panel, a data driver, a driving controller and a processor. According to some embodiments, the display panel includes a pixel circuit. According to some embodiments, the data driver is configured to output a data voltage to the pixel circuit. According to some embodiments, the driving controller is configured to control the data driver. According to some embodiments, the processor is configured to output input image data and an input control signal. According to some embodiments, the pixel circuit includes a first transistor, a second transistor, a third transistor, a seventh transistor, a ninth transistor, a third capacitor and a light emitting element. According to some embodiments, the first transistor includes a control electrode connected to a first node, a first electrode connected to a second node and a second electrode connected to a third node. According to some embodiments, the second transistor is configured to apply the data voltage to the first transistor. According to some embodiments, the third transistor is connected to the first node and the third node. According to some embodiments, the seventh transistor is connected to a fourth node and configured to apply a driving current to the light emitting element. According to some embodiments, the ninth transistor is configured to apply a constant-current voltage to the fourth node. According to some embodiments, the third capacitor includes a first electrode connected to the fourth node and a second electrode connected to an anode electrode of the light emitting element. According to some embodiments, the light emitting element is configured to emit a light based on the data voltage and the constant-current voltage.

In a pixel circuit and an electronic apparatus including the pixel circuit, according to some embodiments, the pixel circuit may include ten transistors and three capacitors. According to some embodiments, the pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, according to some embodiments, at least one transistor in the pulse width modulation circuit and at least one transistor in the constant current generating circuit may be N-type transistors so that a power consumption may be relatively reduced.

In addition, according to some embodiments, the constant current generating circuit includes the third capacitor operating a threshold voltage compensation of the constant current generating circuit so that the number of the transistors may be relatively reduced.

In addition, according to some embodiments, the driving transistor of the pulse width modulation circuit and the driving transistor of the constant current generating circuit may be P-type transistors so that a mobility may be enhanced.

In addition, according to some embodiments, the initialization voltage for initializing the anode electrode of the light emitting element is less than the power voltage applied to the cathode electrode of the light emitting element so that a black characteristic of the pixel circuit may be enhanced.

In addition, according to some embodiments, the first initialization voltage applied to the control electrode of the first transistor and a constant-current voltage applied to the control electrode of the seventh transistor are outputted from the same voltage terminal so that a number of transistors and a number of signal lines may be relatively reduced.

BRIEF DESCRIPTION OF THE DRAWINGS

The above and other features and characteristics of some embodiments of the present disclosure will become more apparent by describing in more detail aspects of some embodiments thereof with reference to the accompanying drawings, in which.

DETAILED DESCRIPTION

Hereinafter, aspects of some embodiments of the present disclosure will be explained in more detail with reference to the accompanying drawings.

Figure 1:
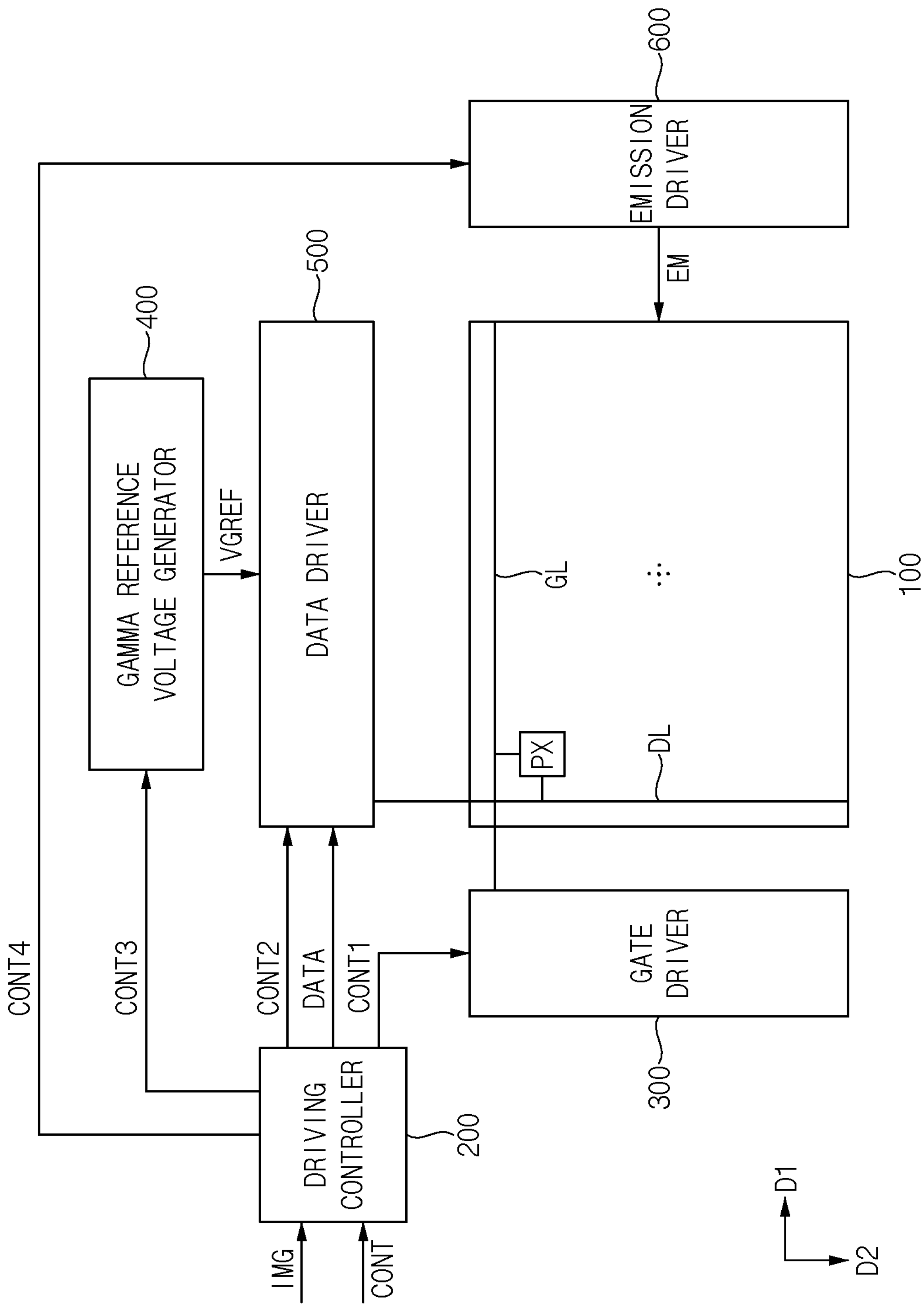
FIG. 1 is a block diagram illustrating a display apparatus according to some embodiments of the present disclosure.

FIG. 1 is a block diagram illustrating a display apparatus according to some embodiments of the present disclosure.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include an emission driver 600.

The display panel 100 has a display region on which images are displayed and a peripheral region adjacent to (e.g., in a peripheral area or outside a footprint of) the display region.

The display panel 100 includes a plurality of gate lines GL, a plurality of data lines DL and a plurality of pixels electrically connected to the gate lines GL and the data lines DL. The gate lines GL may extend in a first direction D1 and the data lines DL may extend in a second direction D2 crossing the first direction D1. The gate lines GL and the data lines DL may be connected to pixel circuits of pixels PX to control emission of the pixels PX to display images. Although FIG. 1 illustrates a single gate line GL, a single data line DL, and a single pixel PX, embodiments according to the present disclosure are not limited thereto, and according to various embodiments, the display panel 100 may include any suitable number of gate lines GL, data lines DL, and pixels PX according to the design and size of the display panel 100.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL.

According to some embodiments of the present disclosure, the gate driver 300 may be integrated on the peripheral region of the display panel 100. According to some embodiments of the present disclosure, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

According to some embodiments of the present disclosure, the data driver 500 may be integrated on the peripheral region of the display panel 100. According to some embodiments of the present disclosure, the data driver 500 may be mounted on the peripheral region of the display panel 100.

The emission driver 600 generates emission signals EM in response to the fourth control signal CONT4 received from the driving controller 200. The emission driver 600 may output the emission signals EM to the display panel 100.

According to some embodiments of the present disclosure, the emission driver 600 may be integrated on the peripheral region of the display panel 100. According to some embodiments of the present disclosure, the emission driver 600 may be mounted on the peripheral region of the display panel 100.

Figure 2:
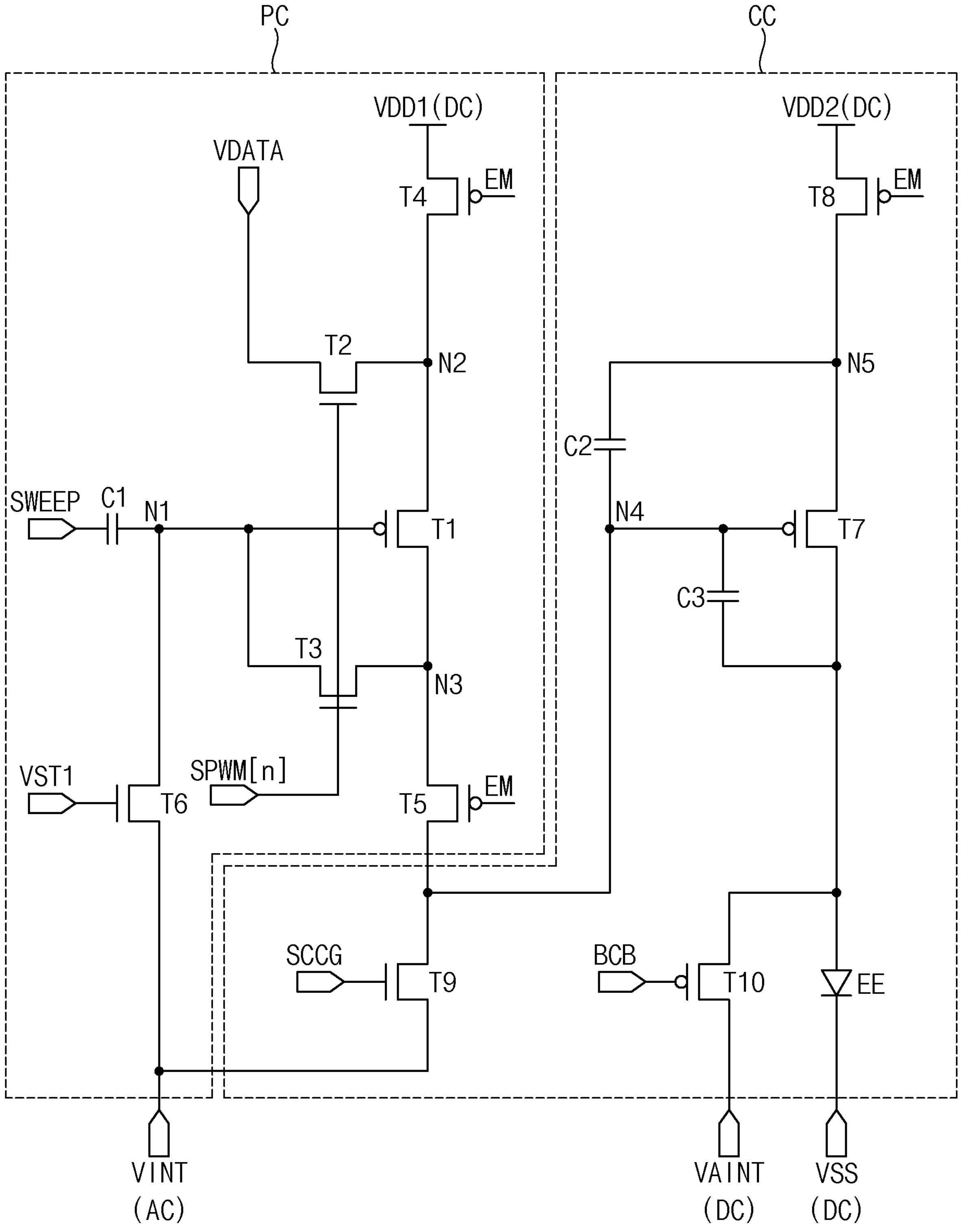
FIG. 2 is a circuit diagram illustrating a pixel circuit of the display panel of FIG. 1.

FIG. 2 is a circuit diagram illustrating a pixel circuit of the display panel 100 of FIG. 1 corresponding to a pixel (e.g., a pixel PX).

Referring to FIGS. 1 and 2, the pixel circuit may include a first circuit PC and a second circuit.

The first circuit PC may be a pulse width modulation circuit for a pulse width modulation (PWM). The second circuit CC may be a constant current generating circuit for a constant current generation (CCG). Although FIG. 2 illustrates various components in a first circuit and a second circuit according to some embodiments of the present disclosure, embodiments are not limited thereto, and according to various embodiments, the first circuit and the second circuit may include additional components or fewer components without departing from the spirit and scope of embodiments according to the present disclosure.

The first circuit PC may include first to sixth transistors T1, T2, T3, T4, T5 and T6 and a first capacitor C1. The second circuit CC may include seventh to tenth T7, T8, T9 and T10, a second capacitor C2 and a third capacitor C3. The second circuit CC may include a light emitting element EE.

For example, the light emitting element EE may be a light emitting diode. According to some embodiments, the light emitting element EE may be a micro light emitting diode.

The pixel circuit includes the first transistor T1, the second transistor T2, the third transistor T3, the seventh transistor T7, the ninth transistor T9 and the light emitting element EE. The first transistor T1 includes a control electrode connected to a first node N1, a first electrode connected to a second node N2 and a second electrode connected to a third node N3. The second transistor T2 applies a data voltage (VPWM of FIG. 4) to the first transistor T1. The third transistor T3 is connected to the first node N1 and the third node N3. The seventh transistor T7 is connected to a fourth node N4 and applies a driving current to the light emitting element EE. The ninth transistor T9 applies a constant-current voltage (VCCG of FIG. 4) to the fourth node N4. The third capacitor C3 includes a first electrode connected to the fourth node N4 and a second electrode connected to an anode electrode of the light emitting element EE. The light emitting element EE emits a light based on the data voltage (VPWM of FIG. 4) and the constant-current voltage (VCCG of FIG. 4).

The first transistor T1 may be a P-type transistor. The seventh transistor T7 may be a P-type transistor. The second transistor T2 may be an N-type transistor. The third transistor T3 may be an N-type transistor.

The second transistor T2 may include a control electrode receiving a first scan signal SPWM[n], a first electrode receiving the data voltage VDATA and a second electrode connected to the second node N2.

The third transistor T3 may include a control electrode receiving the first scan signal SPWM[n], a first electrode connected to the first node N1 and a second electrode connected to the third node N3.

The seventh transistor T7 may include a control electrode connected to the fourth node N4, a first electrode connected to a fifth node N5 and a second electrode connected to the anode electrode of the light emitting element EE.

The ninth transistor T9 may include a control electrode receiving a second scan signal SCCG, a first electrode connected to the fourth node N4 and a second electrode connected to a first initialization voltage terminal.

The light emitting element EE may include the anode electrode and a cathode electrode. The cathode electrode may receive a third power voltage VSS.

The fourth transistor T4 may include a control electrode receiving the emission signal EM, a first electrode receiving a first power voltage VDD1 and a second electrode connected to the second node N2.

The fifth transistor T5 may include a control electrode receiving the emission signal EM, a first electrode connected to the third node N3 and a second electrode connected to the fourth node N4.

The sixth transistor T6 may include a control electrode receiving a first initialization signal VST1, a first electrode connected to the first node N1 and a second electrode connected to the first initialization voltage terminal.

The eighth transistor T8 may include a control electrode receiving the emission signal EM, a first electrode receiving a second power voltage VDD2 and a second electrode connected to the fifth node N5.

The tenth transistor T10 may include a control electrode receiving a second initialization signal BCB, a first electrode connected to the anode electrode of the light emitting element EE and a second electrode receiving a second initialization voltage VAINT.

The first capacitor C1 may include a first electrode receiving a sweep signal SWEEP and a second electrode connected to the first node N1.

The second capacitor C2 may include a first electrode connected to the fifth node N5 and a second electrode connected to the fourth node N4.

As explained above, the pixel circuit may include ten transistors and three capacitors.

For example, the sixth transistor T6 and the ninth transistor T9 may be N-type transistors. The fourth transistor T4, the fifth transistor T5, the eighth transistor T8 and the tenth transistor T10 may be P-type transistors.

According to some embodiments, some of the transistors in the pixel circuit may be P-type transistors and some of the transistors in the pixel circuit may be N-type transistors. For example, the P-type transistor may be a low temperature polycrystalline silicon (LTPS) transistor. For example, the N-type transistor may be an oxide semiconductor transistor. The third transistor T3, the sixth transistor T6 and the ninth transistor T9 may be N-type transistors so that a current leakage at the third transistor T3, the sixth transistor T6 and the ninth transistor T9 may be relatively reduced and accordingly the pixel circuit may be stably operated even when using a relatively low power voltage. Thus, the power consumption of the display apparatus may be relatively reduced by using N-type transistors for the third transistor T3, the sixth transistor T6 and the ninth transistor T9.

According to some embodiments, a first initialization voltage applied to the control electrode of the first transistor T1 and a constant-current voltage applied to the control electrode of the seventh transistor T7 are outputted from the same voltage terminal VINT so that a number of the transistors and a number of the signal lines may be relatively reduced.

The data voltage (VPWM of FIG. 4) may have same or different voltage levels depending on intensities of light emission of pixels. In contrast, the constant-current voltage (VCCG of FIG. 4) may have the same voltage level for all pixels. Alternatively, the constant-current voltage (VCCG of FIG. 4) may have a first voltage level for red pixels, a second voltage level different from the first voltage level for green pixels and a third voltage level different from the first voltage level and the second voltage level for blue pixels.

For example, the first power voltage VDD1 and the second power voltage VDD2 may be high power voltages for determining a light emission degree of the light emitting element EE and the third power voltage VSS may be a low power voltage for determining the light emission degree of the light emitting element EE. The first power voltage VDD1 and the second power voltage VDD2 may be greater than the third power voltage VSS.

In addition, the first power voltage VDD1 may be greater than the second power voltage VDD2.

When the first transistor T1 is turned off and the seventh transistor T7 is turned on in a light emission period, the light emitting element EE may emit a light. When the first transistor T1 is turned on, and accordingly, the first power voltage VDD1 is applied to the control electrode of the seventh transistor T7 in a light emission off period, the seventh transistor T7 may be turned off and the light emitting element EE may stop emitting a light.

Herein, if the first power voltage VDD1 is greater than the second power voltage VDD2, the seventh transistor T7 may be maintained in a turned-off state more reliably when the first power voltage VDD1 is applied to the control electrode of the seventh transistor T7.

For example, the second initialization voltage VAINT may be less than the third power voltage VSS. When the second initialization voltage VAINT is less than the third power voltage VSS, instances or degrees of a leakage current flowing through the light emitting element EE may be prevented or reduced. Thus, a black characteristic of the pixel circuit may be relatively enhanced.

A threshold voltage of the first transistor T1 may be compensated using a diode-connection of the third transistor T3 in a pulse width modulation circuit PC.

A threshold voltage of the seventh transistor T7 may be compensated using a source follower structure including the third capacitor C3 in a constant current generating circuit CC.

The pulse width modulation circuit PC operates a pulse width modulation operation so that a relatively low current may be applied thereto. When the pulse width modulation circuit PC includes the source follower structure, the threshold voltage of the first transistor T1 may not be sufficiently compensated so that a stain may be generated. Thus, the pulse width modulation circuit PC may include a diode-connection structure of the third transistor T3 to compensate the threshold voltage of the first transistor T1.

The constant current generating circuit CC operates a constant-current applying operation so that a relatively high current may be applied thereto. Although the threshold voltage of the seventh transistor T7 is not sufficiently compensated by including the source follower structure in the constant current generating circuit CC, the relatively high current is applied to the constant current generating circuit CC so that a display quality may not be deteriorated. Thus, the constant current generating circuit CC may include the source follower structure of the third capacitor C3 so that the number of the transistors of the pixel circuit may be relatively reduced.

Although the second electrode of the third capacitor C3 is connected to the anode electrode of the light emitting element EE in FIG. 2, alternatively the second electrode of the third capacitor C3 may be connected to a terminal of the first power voltage VDD1. Alternatively, the second electrode of the third capacitor C3 may be connected to a terminal of the second power voltage VDD2. Alternatively, the second electrode of the third capacitor C3 may be connected to a terminal of the third power voltage VSS. Alternatively, the second electrode of the third capacitor C3 may be connected to a terminal of the second initialization voltage VAINT.

According to some embodiments, the first scan signal SPWM[n] may be a progressive scan signal having different timings for pixel rows. Herein,[n] may represent an n-th pixel row. The pixel circuit of FIG. 2 receiving the first scan signal SPWM[n] may be a pixel circuit included in the n-th pixel row.

The first initialization signal VST1, the second initialization signal BCB and the second scan signal SCCG may be global scan signals having the same timing regardless of the pixel row. In addition, the emission signal EM may be a global scan signal having the same timing regardless of the pixel row.

The first power voltage VDD1, the second power voltage VDD2, the third power voltage VDD3 and the second initialization voltage VAINT may be direct-current voltages. In contrast, the voltage outputted from the first initialization voltage terminal may be an alternating voltage. For example, the voltage outputted from the first initialization voltage terminal may have a first level and a second level. The first level may be the first initialization voltage applied to the control electrode of the first transistor T1. The second level may be the constant-current voltage (VCCG of FIG. 4) applied to the control electrode of the seventh transistor T7.

Figure 3:
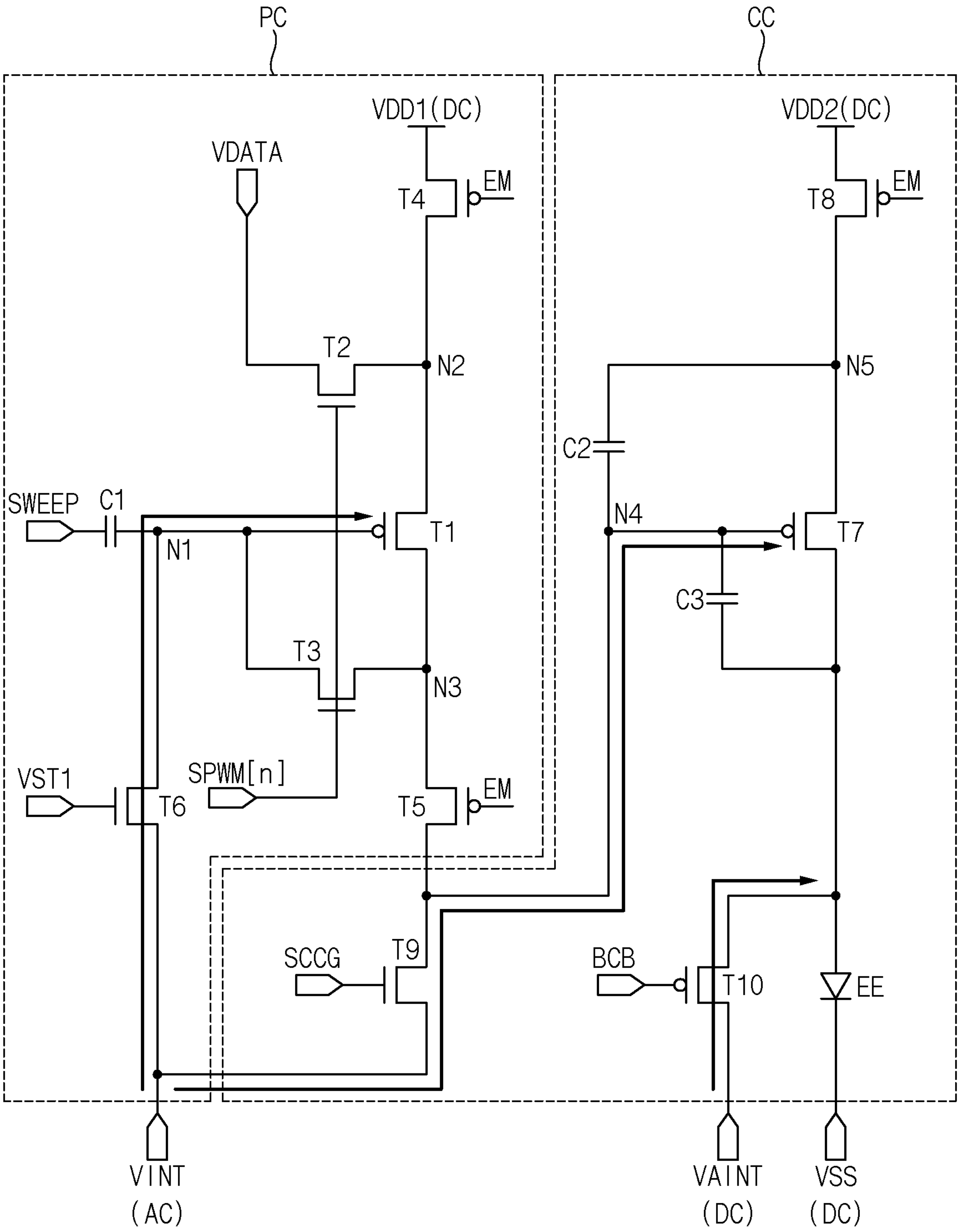
FIG. 3 is a circuit diagram illustrating an operation of the pixel circuit of FIG. 2 in a first period of a driving timing.
Figure 4:
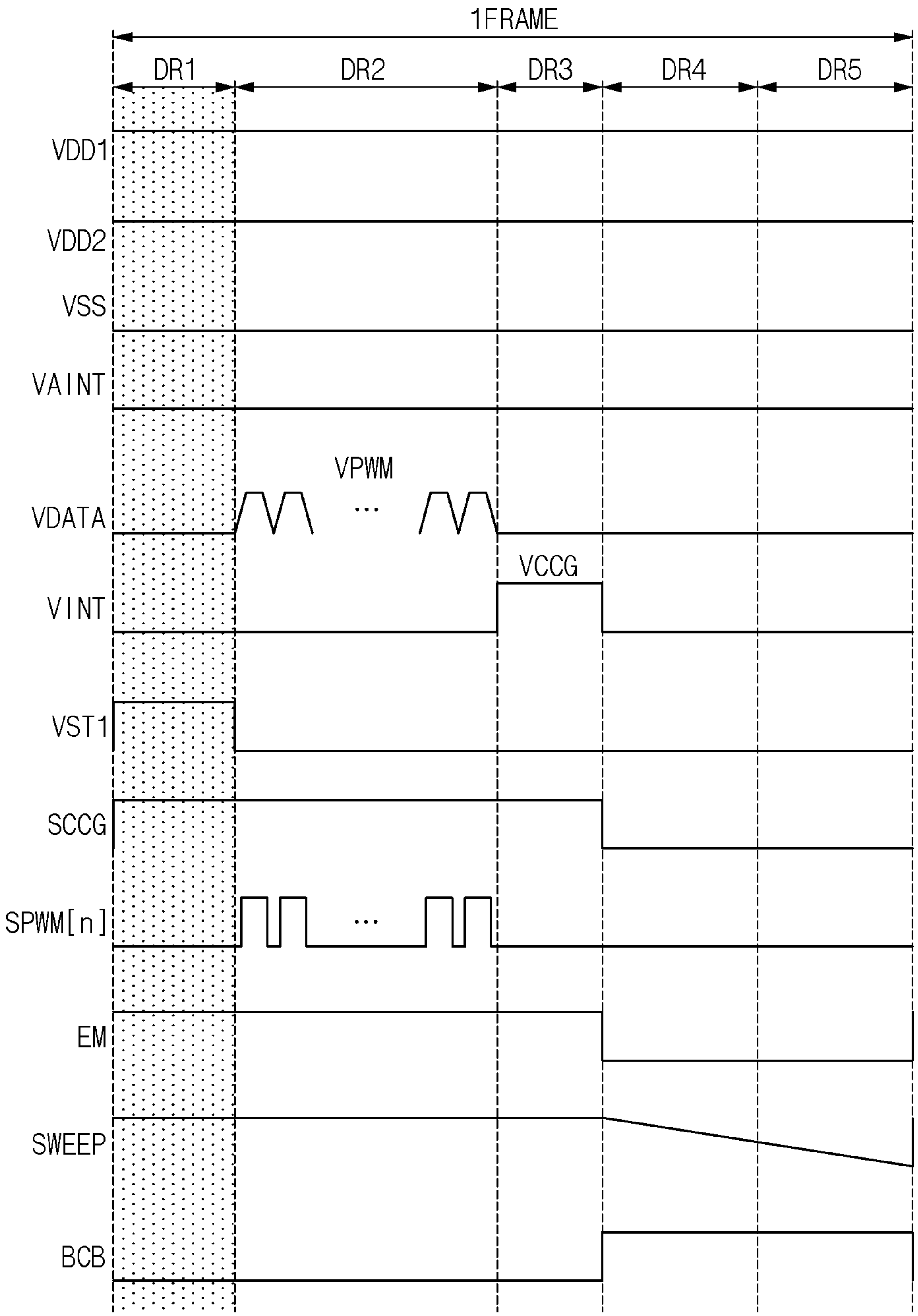
FIG. 4 is a timing diagram illustrating an example of input signals applied to the pixel circuit of FIG. 2 and node signals of the pixel circuit of FIG. 2 in the first period.
Figure 5:
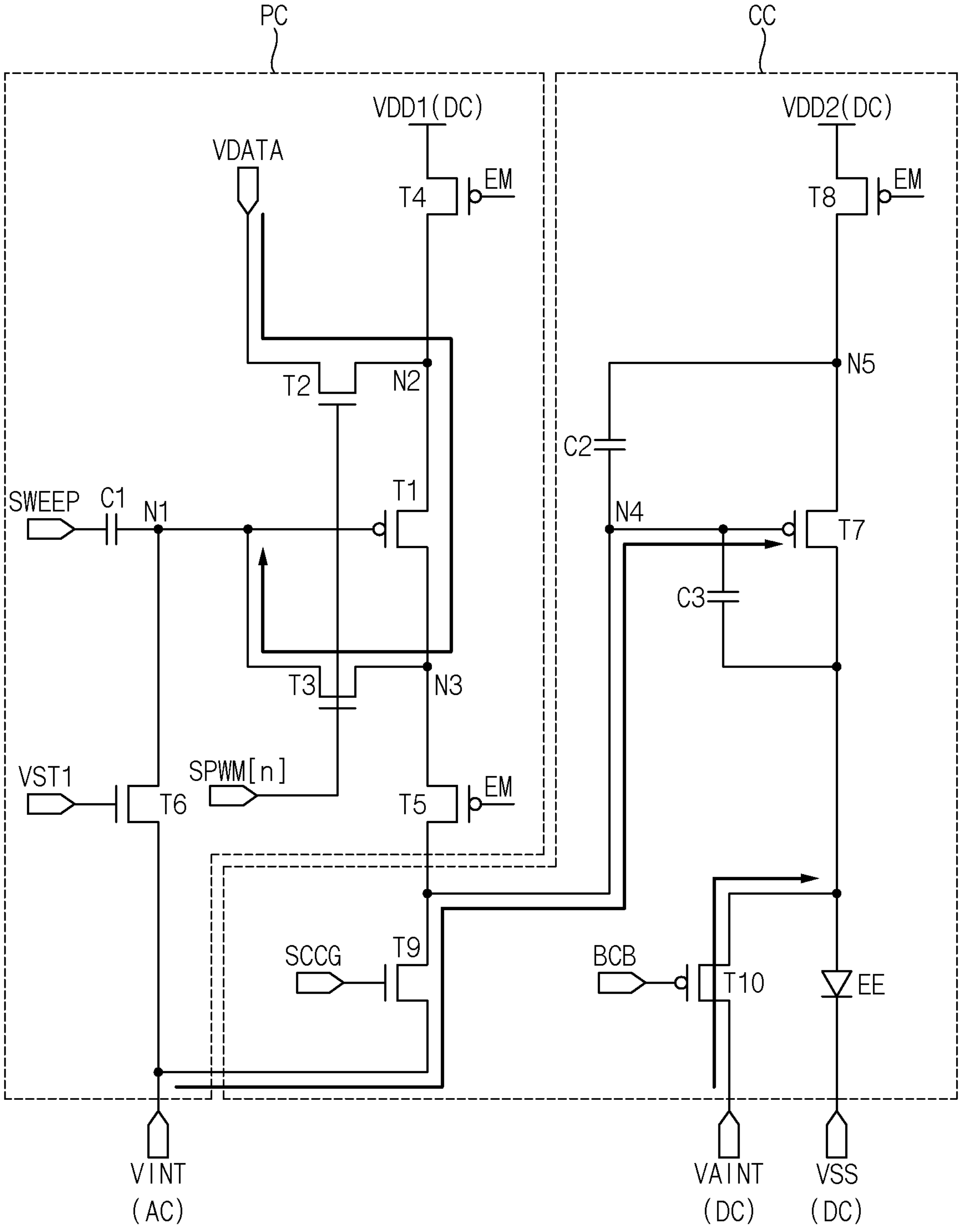
FIG. 5 is a circuit diagram illustrating an operation of the pixel circuit of FIG. 2 in a second period of the driving timing.
Figure 6:
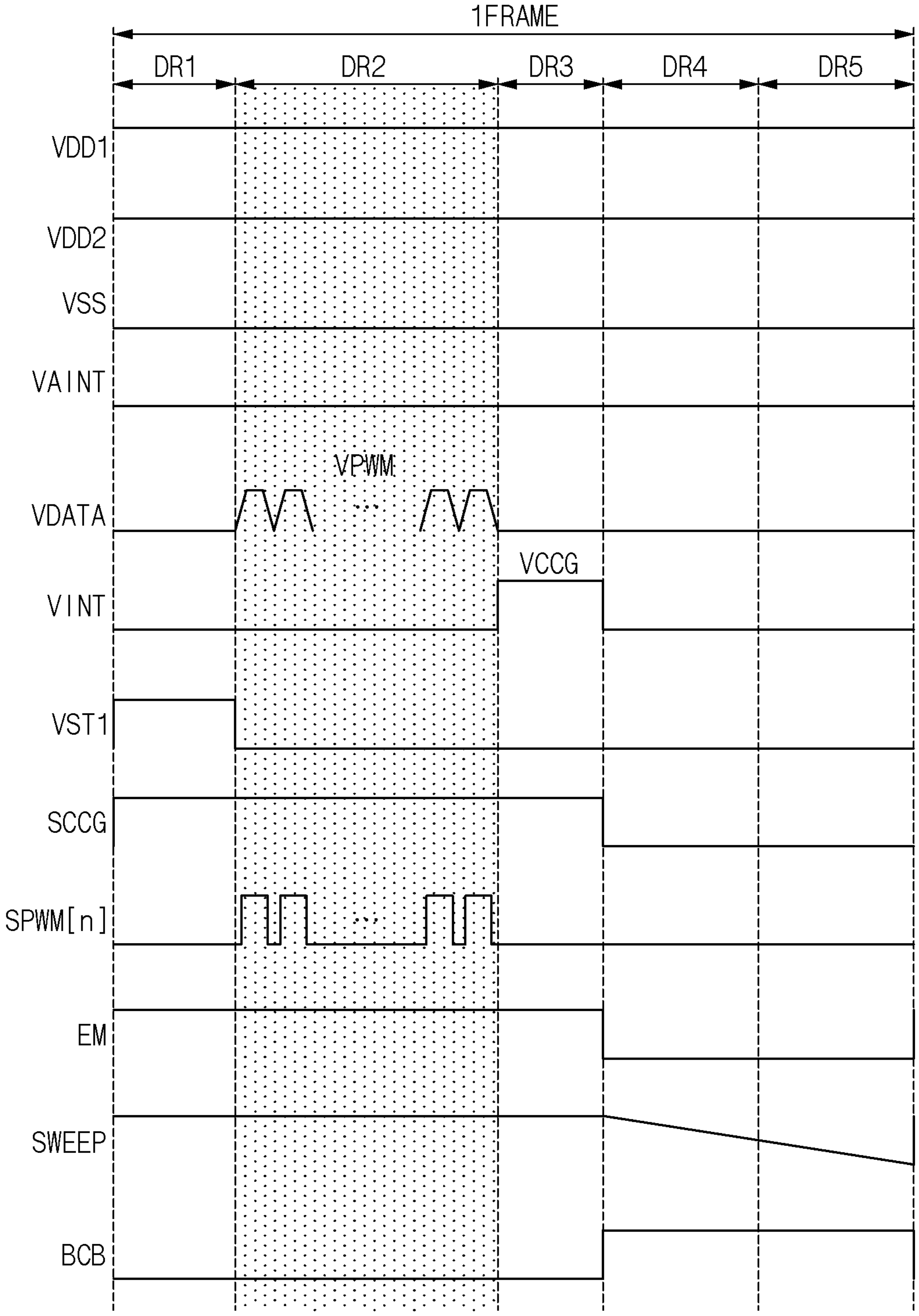
FIG. 6 is a timing diagram illustrating an example of input signals applied to the pixel circuit of FIG. 2 and node signals of the pixel circuit of FIG. 2 in the second period.
Figure 7:
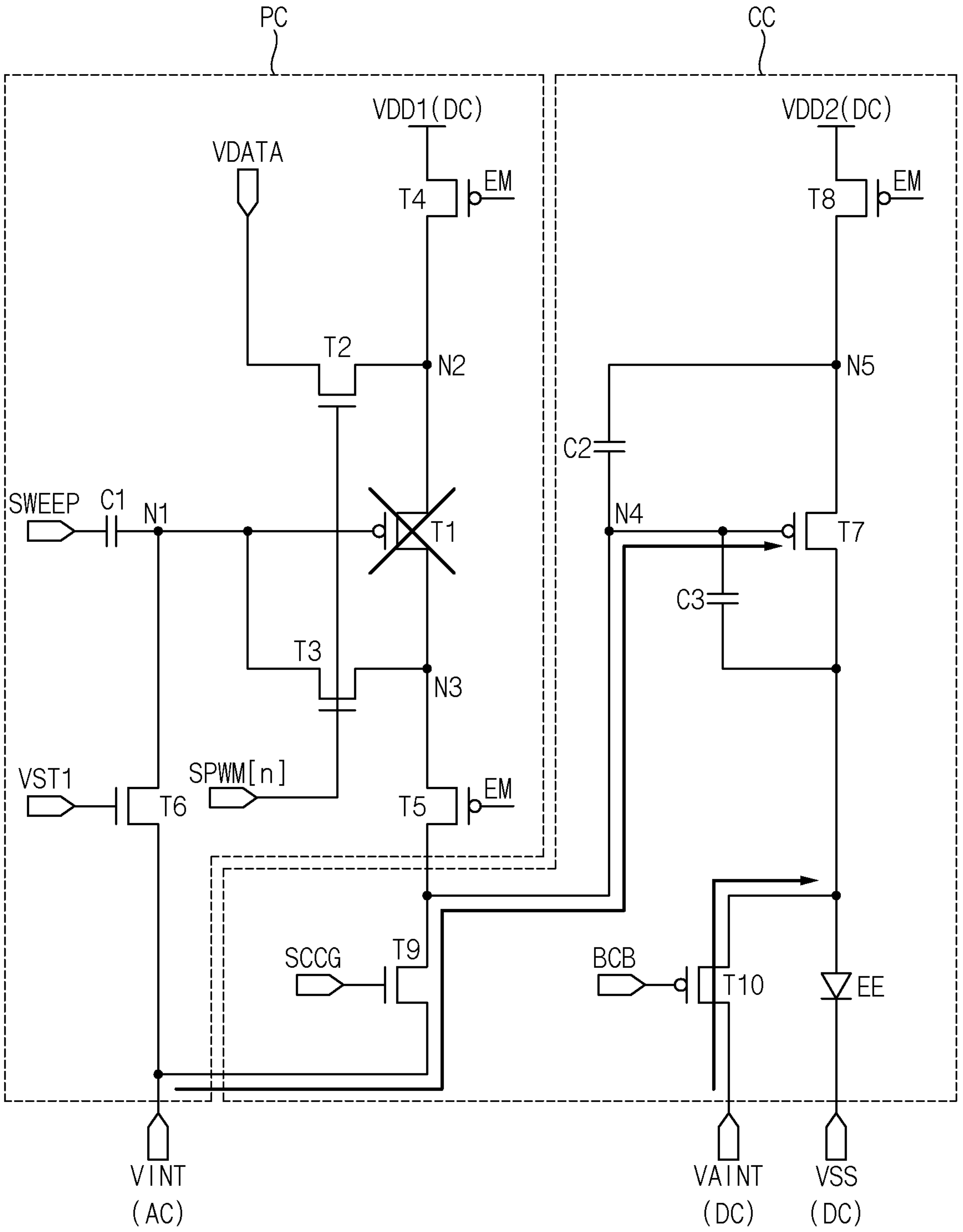
FIG. 7 is a circuit diagram illustrating an operation of the pixel circuit of FIG. 2 in a third period of the driving timing.
Figure 8:
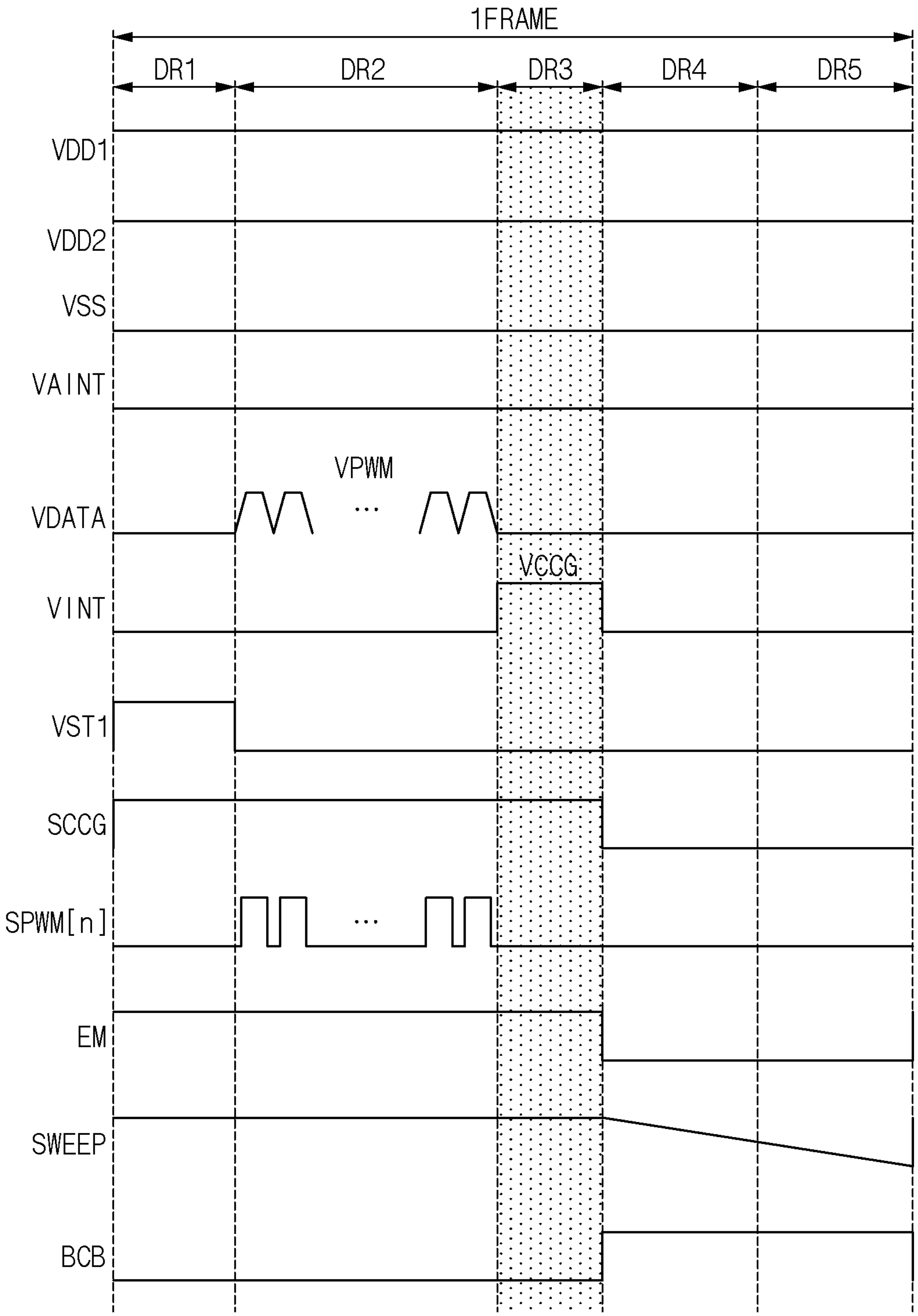
FIG. 8 is a timing diagram illustrating an example of input signals applied to the pixel circuit of FIG. 2 and node signals of the pixel circuit of FIG. 2 in the third period.
Figure 9:
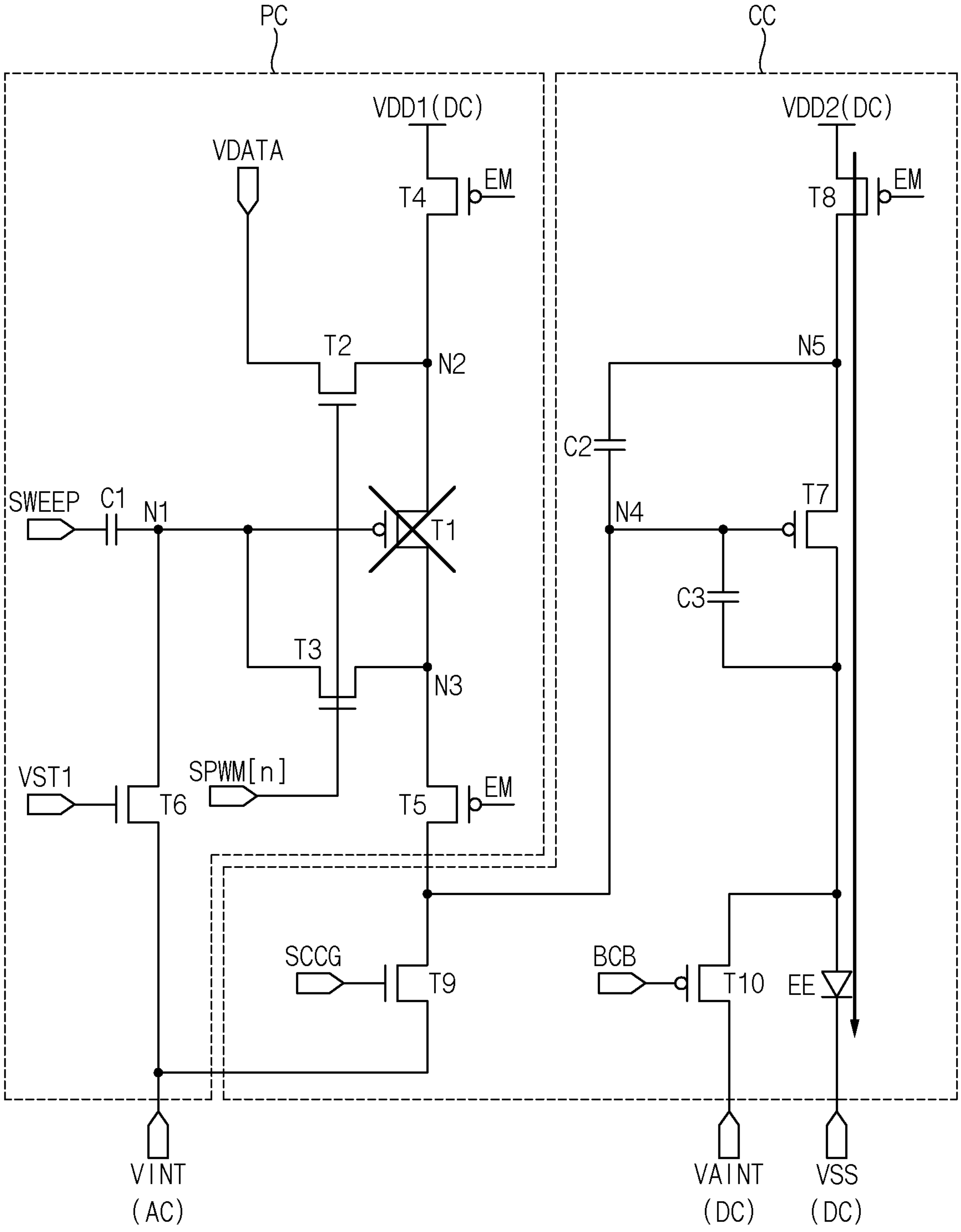
FIG. 9 is a circuit diagram illustrating an operation of the pixel circuit of FIG. 2 in a fourth period of the driving timing.
Figure 10:
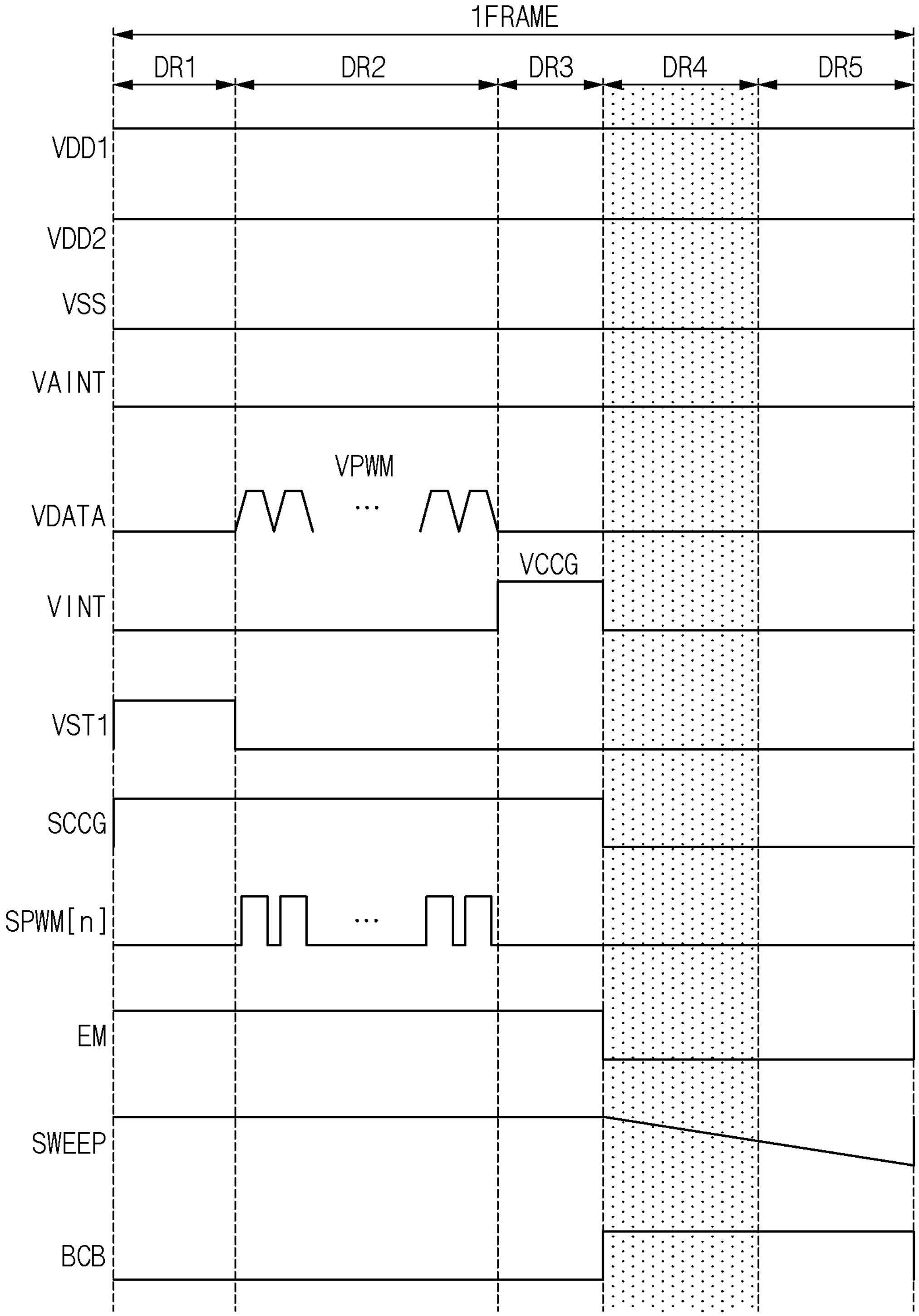
FIG. 10 is a timing diagram illustrating an example of input signals applied to the pixel circuit of FIG. 2 and node signals of the pixel circuit of FIG. 2 in the fourth period.
Figure 11:
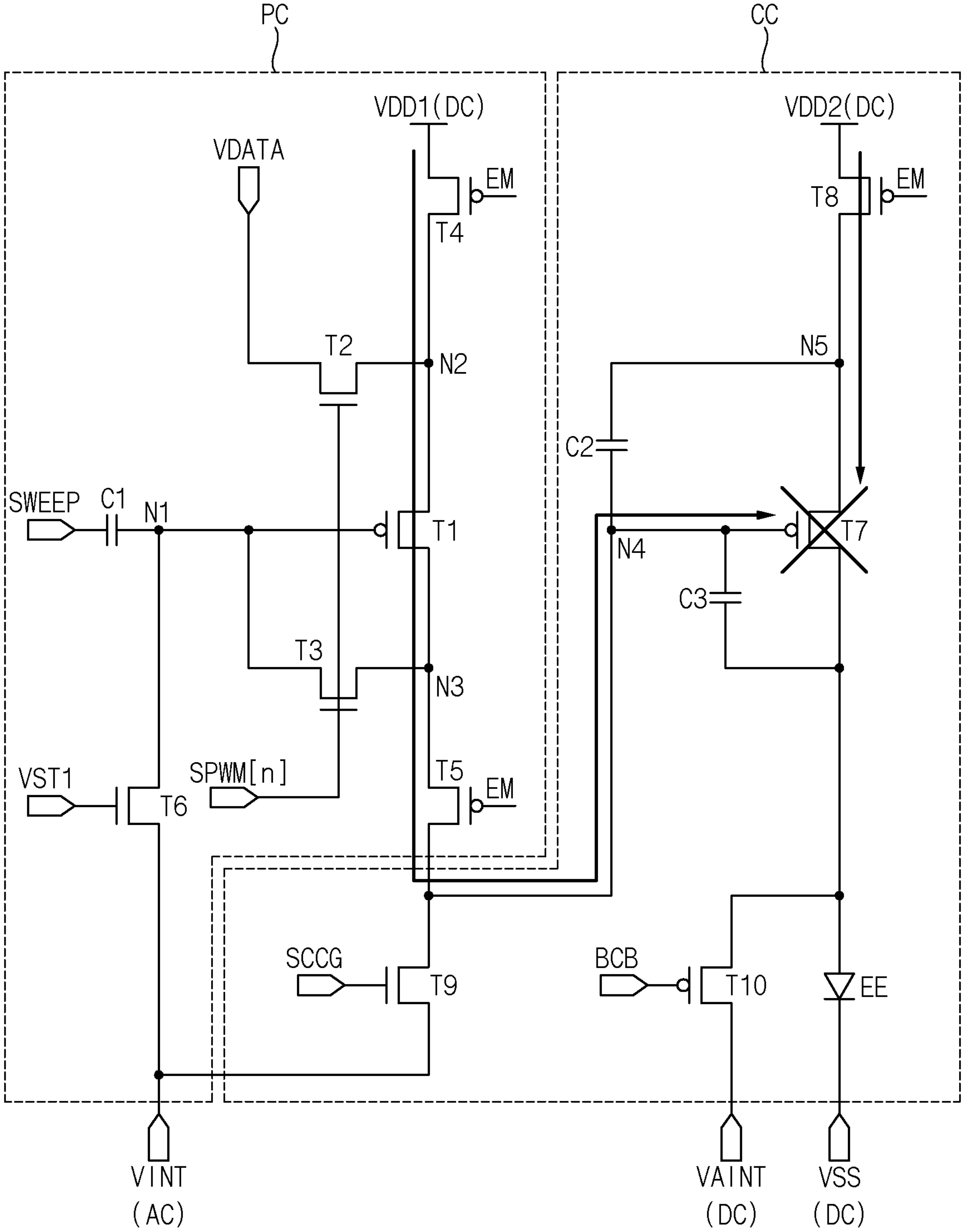
FIG. 11 is a circuit diagram illustrating an operation of the pixel circuit of FIG. 2 in a fifth period of the driving timing.
Figure 12:
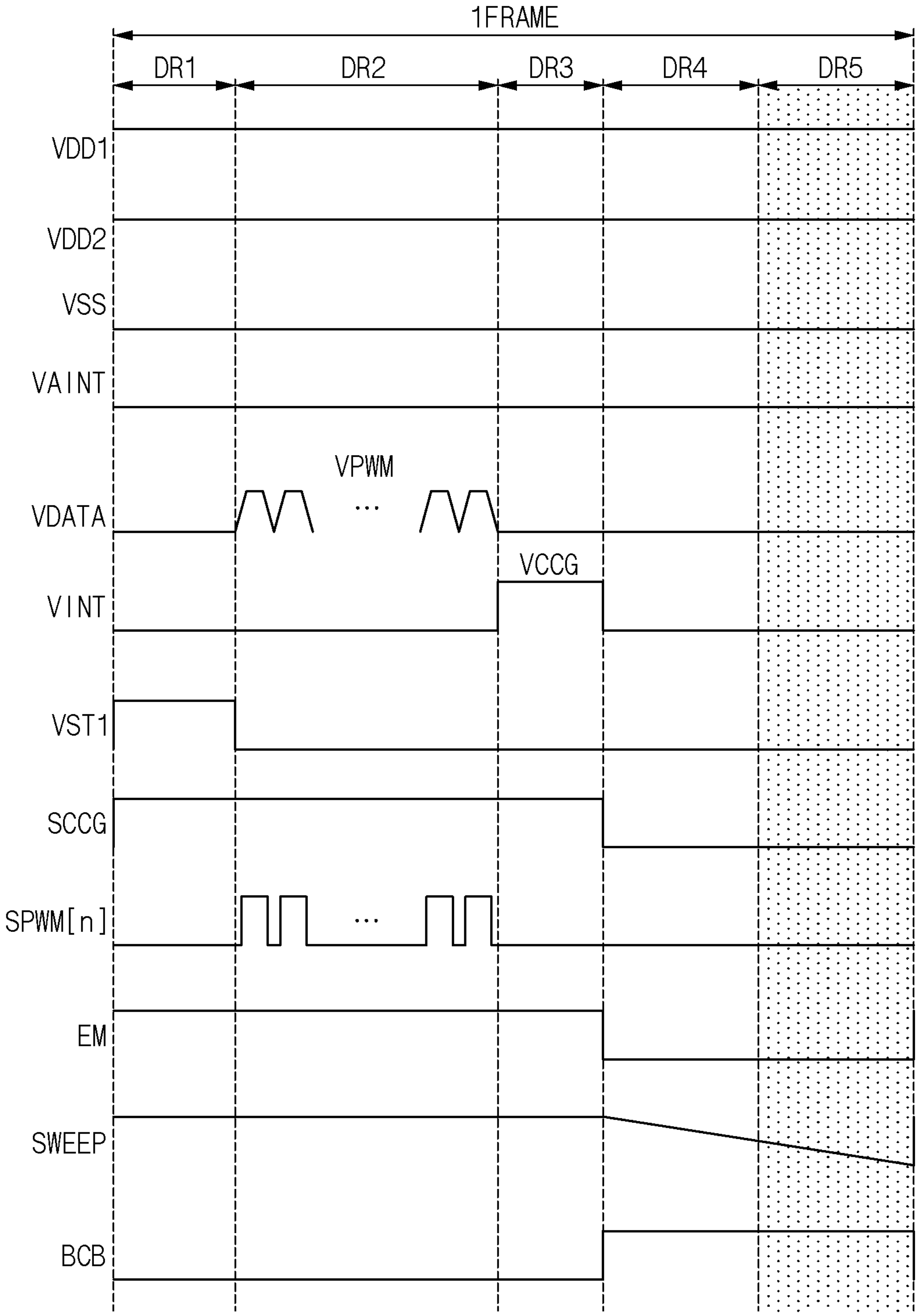
FIG. 12 is a timing diagram illustrating an example of input signals applied to the pixel circuit of FIG. 2 and node signals of the pixel circuit of FIG. 2 in the fifth period.

FIG. 3 is a circuit diagram illustrating an operation of the pixel circuit of FIG. 2 in a first period DR1 of a driving timing. FIG. 4 is a timing diagram illustrating an example of input signals applied to the pixel circuit of FIG. 2 and node signals of the pixel circuit of FIG. 2 in the first period DR1. FIG. 5 is a circuit diagram illustrating an operation of the pixel circuit of FIG. 2 in a second period DR2 of the driving timing. FIG. 6 is a timing diagram illustrating an example of input signals applied to the pixel circuit of FIG. 2 and node signals of the pixel circuit of FIG. 2 in the second period DR2. FIG. 7 is a circuit diagram illustrating an operation of the pixel circuit of FIG. 2 in a third period DR3 of the driving timing. FIG. 8 is a timing diagram illustrating an example of input signals applied to the pixel circuit of FIG. 2 and node signals of the pixel circuit of FIG. 2 in the third period DR3. FIG. 9 is a circuit diagram illustrating an operation of the pixel circuit of FIG. 2 in a fourth period DR4 of the driving timing. FIG. 10 is a timing diagram illustrating an example of input signals applied to the pixel circuit of FIG. 2 and node signals of the pixel circuit of FIG. 2 in the fourth period DR4. FIG. 11 is a circuit diagram illustrating an operation of the pixel circuit of FIG. 2 in a fifth period DR5 of the driving timing FIG. 12 is a timing diagram illustrating an example of input signals applied to the pixel circuit of FIG. 2 and node signals of the pixel circuit of FIG. 2 in the fifth period DR5.

In the driving timing, the first period DR1 may be an initialization period, the second period DR2 may be a pulse width modulation data writing and compensation period, the third period DR3 may be a constant-current voltage writing period, the fourth period DR4 may be the light emission period and the fifth period DR5 may be the light emission off period.

A width of the fourth period DR4 which is the light emission period may be determined by a level of the pulse width modulation data VPWM.

The sweep signal SWEEP may have a constant high level in the first period DR1, the second period DR2 and the third period DR3 and may gradually decrease in the fourth period DR4 and the fifth period DR5.

Although waveforms of the first scan signal SPWM[n] and waveforms of the data voltage VDATA are plural in FIGS. 4, 6, 8, 10, 12, 13, 14 and 16 for convenience of explanation, this does not mean that the first scan signal SPWM[n] and the data voltage VDATA are applied multiple times, but means that the first scan signal SPWM[n] is sequentially scanned for each pixel row and the data voltage VDATA is written in each pixel row.

Referring to FIGS. 3 and 4, in the first period DR1, the first initialization signal VST1 may have an active level, the second initialization signal BCB may have an active level, the first scan signal SPWM[n] may have an inactive level, the second scan signal SCCG may have an active level, the emission signal EM may have an inactive level, the sweep signal SWEEP may have the high level and the voltage outputted from the first initialization voltage terminal may have the first level (the first initialization voltage).

Herein, when the transistor receiving the first initialization signal VST1, the second initialization signal BCB, the first scan signal SPWM[n], the second scan signal SCCG and the emission signal EM is a P-type transistor, the active level may be a low level and the inactive level may be a high level. In contrast, when the transistor receiving the first initialization signal VST1, the second initialization signal BCB, the first scan signal SPWM[n], the second scan signal SCCG and the emission signal EM is an N-type transistor, the active level may be a high level and the inactive level may be a low level.

The first period DR1 may be the initialization period. In the initialization period DR1, the sixth transistor T6, the ninth transistor T9 and the tenth transistor T10 may be turned on.

In the initialization period DR1, the control electrode (the first node N1) of the first transistor T1 may be initialized by the first initialization voltage through the sixth transistor T6. The first initialization voltage may be a level to turn on the first transistor T1. In the initialization period DR1, the control electrode (the fourth node N4) of the seventh transistor T7 may be initialized by the first initialization voltage through the ninth transistor T9. The first initialization voltage may be a level to turn off the seventh transistor T7. In the initialization period DR1, the anode electrode of the light emitting element EE may be initialized by the second initialization voltage VAINT through the tenth transistor T10.

Referring to FIGS. 5 and 6, in the second period DR2 subsequent to the first period DR1, the first initialization signal VST1 may have an inactive level, the second initialization signal BCB may have the active level, the first scan signal SPWM[n] may have an active level, the second scan signal SCCG may have the active level, the emission signal EM may have the inactive level and the sweep signal SWEEP may have the high level.

The second period DR2 may be the pulse width modulation data writing and compensation period. In the pulse width modulation data writing and compensation period DR2, the second transistor T2 may be turned on by the first scan signal SPWM[n], the first transistor T1 may be turned on by the first initialization voltage in the initialization period DR1 and the third transistor T3 may be turned on by the first scan signal SPWM[n]. In the pulse width modulation data writing and compensation period DR2, a turned-on state of the ninth transistor T9 and a turned-on state of the tenth transistor T10 may be maintained.

In the pulse width modulation data writing and compensation period DR2, the data voltage VPWM may be applied to the control electrode of the first transistor T1 along a path of the second transistor T2, the first transistor T1 and the third transistor T3. By the third transistor T3 which is diode-connected, a threshold voltage of the first transistor T1 may be compensated in the data voltage VPWM.

In the pulse width modulation data writing and compensation period DR2, a voltage level of the control electrode of the first transistor T1 may be VPWM+Vth_T1. Herein, Vth_T1 may mean a threshold voltage of the first transistor T1. In the pulse width modulation data writing and compensation period DR2, when VPWM+Vth_T1 is completely stored in the control electrode of the first transistor T1, the first transistor T1 may be turned off.

Referring to FIGS. 7 and 8, in the third period DR3 subsequent to the second period DR2, the first initialization signal VST1 may have the inactive level, the second initialization signal BCB may have the active level, the first scan signal SPWM[n] may have the inactive level, the second scan signal SCCG may have the active level, the emission signal EM may have the inactive level, the sweep signal SWEEP may have the high level and the voltage outputted from the first initialization voltage terminal may have the second level VCCG.

The third period DR3 may be the constant-current voltage writing period. In the constant-current voltage writing period DR3, the ninth transistor T9 may be turned on by the second scan signal SCCG. In the constant-current voltage writing period DR3, the turned-on state of the tenth transistor T10 may be maintained.

In the constant-current voltage writing period DR3, the constant-current voltage VCCG may be applied to the control electrode of the seventh transistor T7 through the ninth transistor T9. In the constant-current voltage writing period DR3, when the constant-current voltage VCCG is applied to the control electrode of the seventh transistor T7, the seventh transistor T7 may be turned on.

When the first initialization voltage applied to a first initialization voltage terminal VINT is VCCGREF and the threshold voltage of the seventh transistor T7 is Vth7, the voltage of the fifth node N5 may be VCCGREF+Vth7+VCCG in the constant-current voltage writing period DR3. The voltage of the anode electrode may be VANODE' in the constant-current voltage writing period DR3.

Referring to FIGS. 9 and 10, in the fourth period DR4 subsequent to the third period DR3, the first initialization signal VST1 may have the inactive level, the second initialization signal BCB may have an inactive level, the first scan signal SPWM[n] may have the inactive level, the second scan signal SCCG may have the inactive level, the emission signal EM may have an active level and the sweep signal SWEEP may gradually decrease from the high level.

The fourth period DR4 may be the light emission period. In the light emission period DR4, the fourth transistor T4, the fifth transistor T5 and the eighth transistor T8 may be turned on by the emission signal EM and the seventh transistor T7 may be turned on by the constant-current voltage VCCG.

In the light emission period DR4, a current may flow along a path of the seventh transistor T7, the eighth transistor T8 and the light emitting element EE so that the light emitting element EE may emit a light.

In the light emission period DR4, the voltage of the fifth node N5 may be VCCGREF+Vth7+VCCG and the voltage of the anode electrode may be VANODE. In the light emission period DR4, the voltage VG7 of the fourth node N4 may be determined by following Equation 1.

$$VG7=\frac{C2}{C2+C3}(VCCGREF+Vth7+VCCG)+\frac{C3}{C2+C3}(VANODE-VANODE')\qquad\text{Equation 1}$$

When the threshold voltage of the fourth transistor T7 decreases in the light emission period DR4, the voltage VANODE of the anode electrode may increase. When the voltage VANODE of the anode electrode increases, a gate voltage VG7 of the seventh transistor T7 may increase by a coupling of the third capacitor C3. When the gate voltage VG7 of the seventh transistor T7 increases, a current flowing through the seventh transistor T7 may decrease. In this way, the third capacitor C3 may compensate the threshold voltage of the seventh transistor T7.

Referring to FIGS. 11 and 12, in the fifth period DR5 subsequent to the fourth period DR4, the first initialization signal VST1 may have the inactive level, the second initialization signal BCB may have the inactive level, the first scan signal SPWM[n] may have the inactive level, the second scan signal SCCG may have the inactive level, the emission signal EM may have the active level, the sweep signal SWEEP may gradually decrease following the fourth period DR4.

The fifth period DR5 may be the light emission off period. As the sweep signal SWEEP decreases, the first transistor T1 may be turned on at a certain time point. The certain time point when the first transistor T1 is turned on may be determined by the data voltage VPWM applied to the control electrode of the first transistor T1.

When the first transistor T1 is turned on, the first power voltage VDD1 is applied to the control electrode of the seventh transistor T7 along a path of the fourth transistor T4, the first transistor and the fifth transistor T5.

When the first power voltage VDD1 is applied to the control electrode of the seventh transistor T7, the seventh transistor T7 may be turned off and the light emitting element EE may stop emitting a light.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

Figure 13:
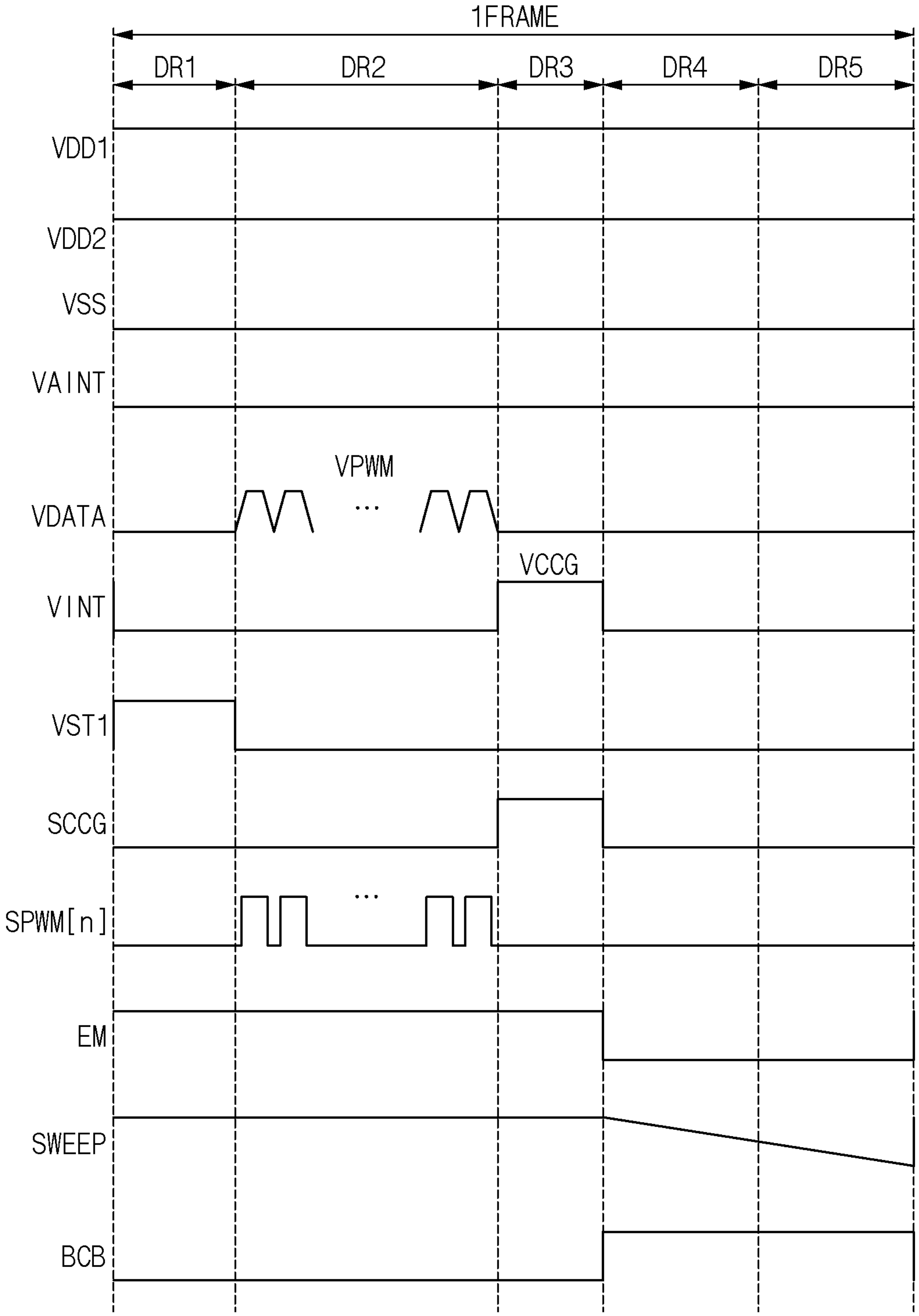
FIG. 13 is a timing diagram illustrating an example of input signals applied to the pixel circuit of FIG. 2 and node signals of the pixel circuit of FIG. 2.

FIG. 13 is a timing diagram illustrating an example of input signals applied to the pixel circuit of FIG. 2 and node signals of the pixel circuit of FIG. 2.

The driving timing of the pixel circuit according to the present embodiments is the same (or substantially the same) as the driving timing of the previous embodiments explained referring to FIGS. 4, 6, 8, 10 and 12 except for a waveform of the second scan signal SCCG in the initialization period DR1. Thus, the same reference numerals will be used to refer to the same or like parts as those described in the previous embodiments and any repetitive explanation concerning the above elements will be omitted.

Referring to FIGS. 1, 2 and 13, in the driving timing, a first period DR1 may be an initialization period, a second period DR2 may be a pulse width modulation data writing and compensation period, a third period DR3 may be a constant-current voltage writing period, a fourth period DR4 may be the light emission period and a fifth period DR5 may be the light emission off period.

In the first period DR1, the first initialization signal VST1 may have an active level, the second initialization signal BCB may have an active level, the first scan signal SPWM[n] may have an inactive level, the second scan signal SCCG may have an inactive level, the emission signal EM may have an inactive level, the sweep signal SWEEP may have the high level and the voltage outputted from the first initialization voltage terminal may have the first level (the first initialization voltage).

In the second period DR2 subsequent to the first period DR1, the first initialization signal VST1 may have an inactive level, the second initialization signal BCB may have the active level, the first scan signal SPWM[n] may have an active level, the second scan signal SCCG may have the inactive level, the emission signal EM may have the inactive level and the sweep signal SWEEP may have the high level.

In the third period DR3 subsequent to the second period DR2, the first initialization signal VST1 may have the inactive level, the second initialization signal BCB may have the active level, the first scan signal SPWM[n] may have the inactive level, the second scan signal SCCG may have an active level, the emission signal EM may have the inactive level, the sweep signal SWEEP may have the high level and the voltage outputted from the first initialization voltage terminal may have the second level VCCG.

The second scan signal SCCG may have the inactive level in the first period DR1 and the second period DR2 and may have the active level in the third period DR3. In the constant-current voltage writing period DR3, the ninth transistor T9 may be turned on by the second scan signal SCCG. In the constant-current voltage writing period DR3, the constant-current voltage VCCG may be applied to the control electrode of the seventh transistor T7 through the ninth transistor T9.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

Figure 14:
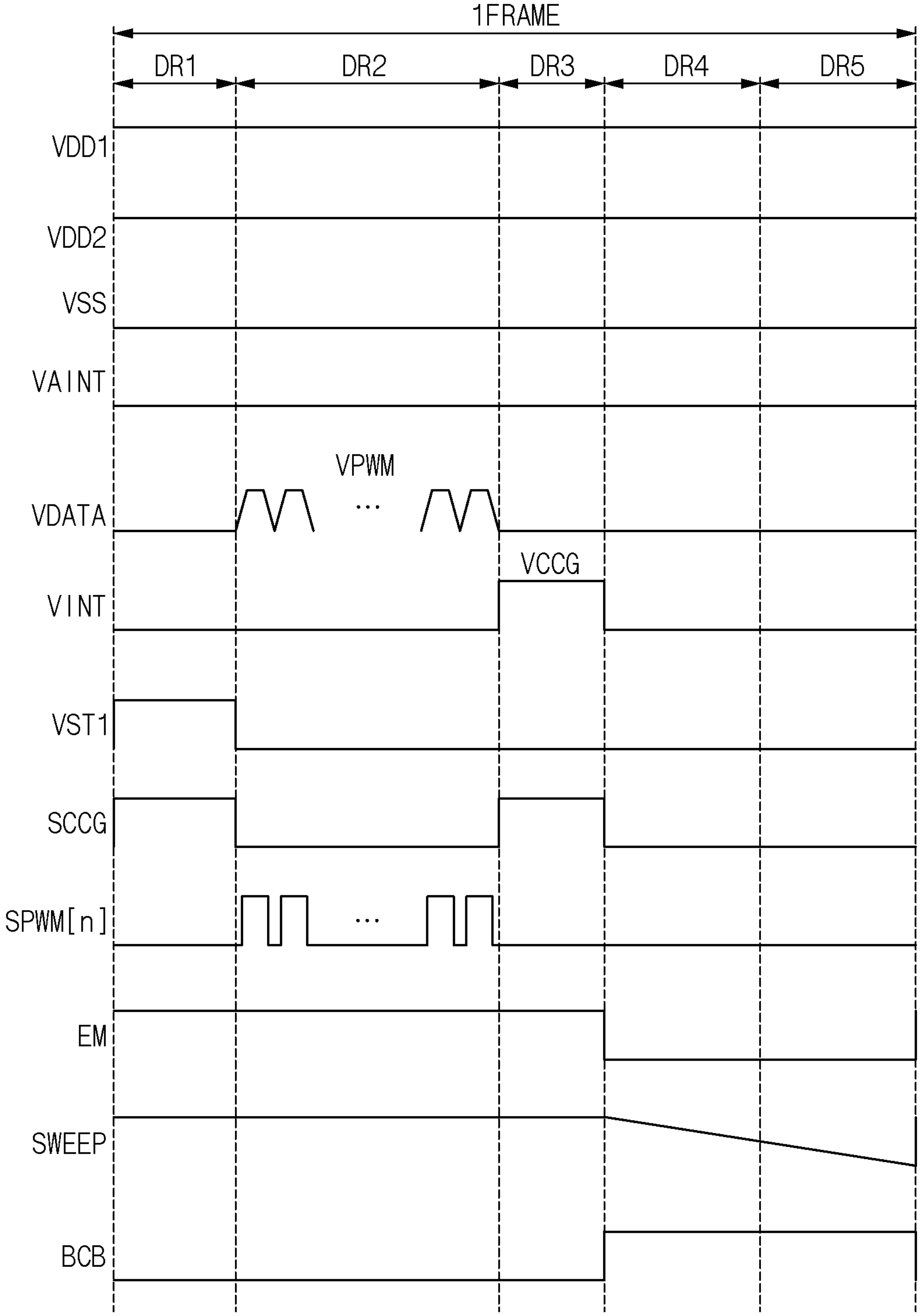
FIG. 14 is a timing diagram illustrating an example of input signals applied to the pixel circuit of FIG. 2 and node signals of the pixel circuit of FIG. 2.

FIG. 14 is a timing diagram illustrating an example of input signals applied to the pixel circuit of FIG. 2 and node signals of the pixel circuit of FIG. 2.

The driving timing of the pixel circuit according to the present embodiments is the same (or substantially the same) as the driving timing of the previous embodiments explained referring to FIGS. 4, 6, 8, 10 and 12 except for a waveform of the second scan signal SCCG in the pulse width modulation data writing and compensation period DR2. Thus, the same reference numerals will be used to refer to the same or like parts as those described in the previous embodiments and any repetitive explanation concerning the above elements will be omitted.

Referring to FIGS. 1, 2 and 14, in the driving timing, a first period DR1 may be an initialization period, a second period DR2 may be a pulse width modulation data writing and compensation period, a third period DR3 may be a constant-current voltage writing period, a fourth period DR4 may be the light emission period and a fifth period DR5 may be the light emission off period.

In the first period DR1, the first initialization signal VST1 may have an active level, the second initialization signal BCB may have an active level, the first scan signal SPWM [n] may have an inactive level, the second scan signal SCCG may have an active level, the emission signal EM may have an inactive level, the sweep signal SWEEP may have the high level and the voltage outputted from the first initialization voltage terminal may have the first level (the first initialization voltage).

In the second period DR2 subsequent to the first period DR1, the first initialization signal VST1 may have an inactive level, the second initialization signal BCB may have the active level, the first scan signal SPWM[n] may have an active level, the second scan signal SCCG may have an inactive level, the emission signal EM may have the inactive level and the sweep signal SWEEP may have the high level.

In the third period DR3 subsequent to the second period DR2, the first initialization signal VST1 may have the inactive level, the second initialization signal BCB may have the active level, the first scan signal SPWM[n] may have the inactive level, the second scan signal SCCG may have the active level, the emission signal EM may have the inactive level, the sweep signal SWEEP may have the high level and the voltage outputted from the first initialization voltage terminal may have the second level VCCG.

The second scan signal SCCG may have the active level in the first period DR1 and the third period DR3 and may have the inactive level in the second period DR2. In the initialization period DR1, the ninth transistor T9 may be turned on by the second scan signal SCCG. In the initialization period DR1, the first initialization voltage may be applied to the control electrode of the seventh transistor T7 through the ninth transistor T9. In the constant-current voltage writing period DR3, the ninth transistor T9 may be turned on by the second scan signal SCCG. In the constant-current voltage writing period DR3, the constant-current voltage VCCG may be applied to the control electrode of the seventh transistor T7 through the ninth transistor T9.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

Figure 15:
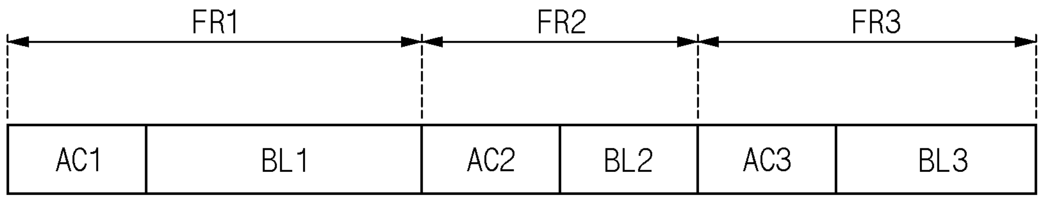
FIG. 15 is a diagram illustrating a driving frequency of the display panel of FIG. 1.
Figure 16:
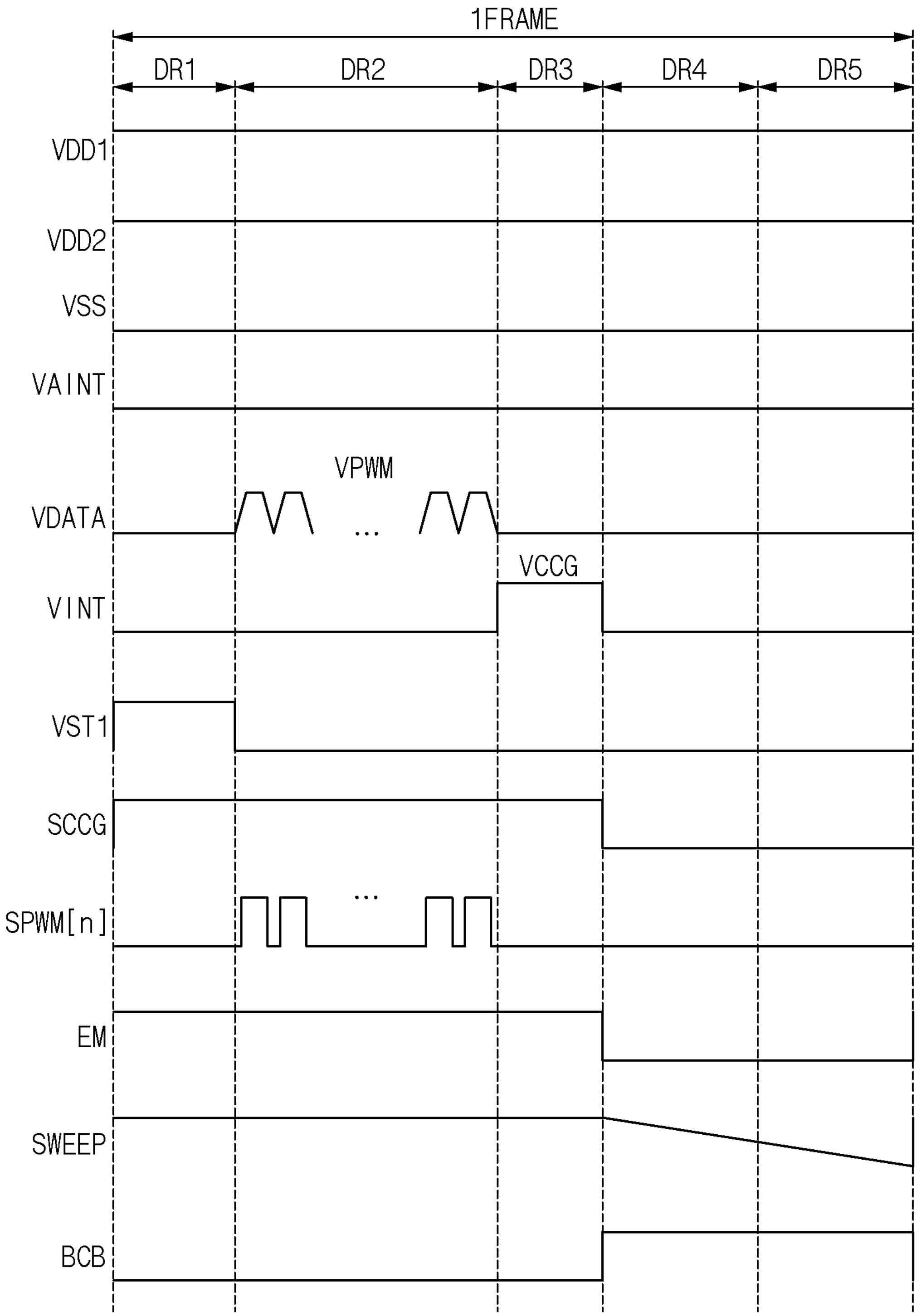
FIG. 16 is a timing diagram illustrating an example of input signals applied to the pixel circuit of FIG. 2 and node signals of the pixel circuit of FIG. 2 in a writing frame.
Figure 17:
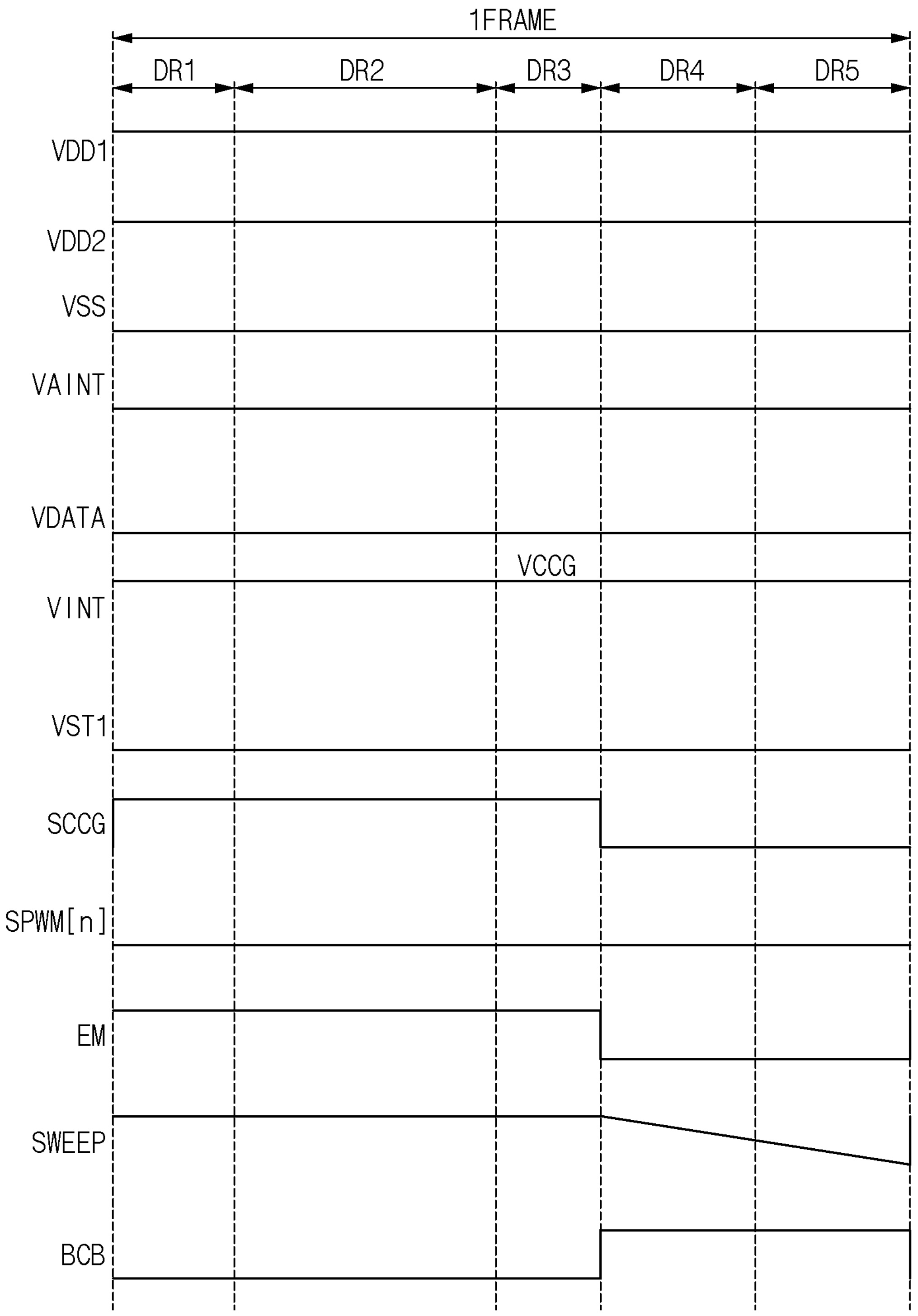
FIG. 17 is a timing diagram illustrating an example of input signals applied to the pixel circuit of FIG. 2 and node signals of the pixel circuit of FIG. 2 in a holding frame.

FIG. 15 is a diagram illustrating a driving frequency of the display panel 100 of FIG. 1. FIG. 16 is a timing diagram illustrating an example of input signals applied to the pixel circuit of FIG. 2 and node signals of the pixel circuit of FIG. 2 in a writing frame. FIG. 17 is a timing diagram illustrating an example of input signals applied to the pixel circuit of FIG. 2 and node signals of the pixel circuit of FIG. 2 in a holding frame.

The driving timing of the pixel circuit according to the present embodiments is the same (or substantially the same) as the driving timing of the previous embodiments explained referring to FIGS. 4, 6, 8, 10 and 12 except that the display panel is driven in a variable frequency. Thus, the same reference numerals will be used to refer to the same or like parts as those described in the previous embodiments and any repetitive explanation concerning the above elements will be omitted.

Referring to FIGS. 1, 2 and 15 to 17, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length the same (or substantially the same) as a length of the second active period AC2. The first blank period BL1 may have a length different from a length of the second blank period BL2.

The second active period AC2 may have the length the same (or substantially the same) as a length of the third active period AC3. The second blank period BL2 may have the length different from a length of the third blank period BL3.

The display apparatus supporting the variable frequency may include a writing frame in which the data voltage is written to the pixel and a holding frame in which only light emission is operated without writing the data voltage to the pixel. The writing frame may be in the active period AC1, AC2 and AC3. The holding frame may be in the blank period BL1, BL2 and BL3.

For example, in the writing frame, the data voltage VPWM may be applied to the first transistor T1 and the light emitting element EE may emit a light. For example, in the holding frame, the data voltage VPWM may not be applied to the first transistor T1 and the light emitting element EE may emit a light.

In the driving timing of the writing frame of FIG. 16, the first period DR1 may be an initialization period, the second period DR2 may be a pulse width modulation data writing and compensation period, the third period DR3 may be a constant-current voltage writing period, the fourth period DR4 may be a light emission period and the fifth period DR5 may be a light emission off period. The driving timing of the writing frame of FIG. 16 may be the same (or substantially the same) as the driving timings of FIGS. 4, 6, 8, 10 and 12.

In the driving timing of the holding frame of FIG. 17, the first period DR1 may be an initialization period, the second period DR2 may be a pulse width modulation data writing and compensation period, the third period DR3 may be a constant-current voltage writing period, the fourth period DR4 may be a light emission period and the fifth period DR5 may be a light emission off period. In the holding frame, the voltage VDATA of a data voltage terminal maintains a constant level, the voltage VINT of the first initialization terminal may maintain the second level VCCG and the first initialization signal VST1 may maintain an inactive level and the first scan signal SPWM[n] may maintain an inactive level. The second scan signal SCCG may have an active level in the first period DR1, the second period DR2 and the third period DR1, DR2 and DR3 and may have an inactive level in the fourth period DR4 and the fifth period DR5.

In the first period (DR1 of FIG. 16) of the writing frame, the first initialization signal VST1 may have an active level. In the second period (DR2 of FIG. 16) of the writing frame, the first scan signal SPWM[n] may have an active pulse. In the first period (DR1 of FIG. 17) of the holding frame in which the data voltage VPWM is not applied to the first transistor T1 and the light emitting element EE emits a light, the first initialization signal VST1 may have an inactive level. In the second period (DR2 of FIG. 17) of the holding frame, the first scan signal SPWM[n] may have an inactive level.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

In addition, according to some embodiments, the pixel circuit may support a variable frequency driving method so that the power consumption of the display apparatus may be relatively reduced.

Figure 18:
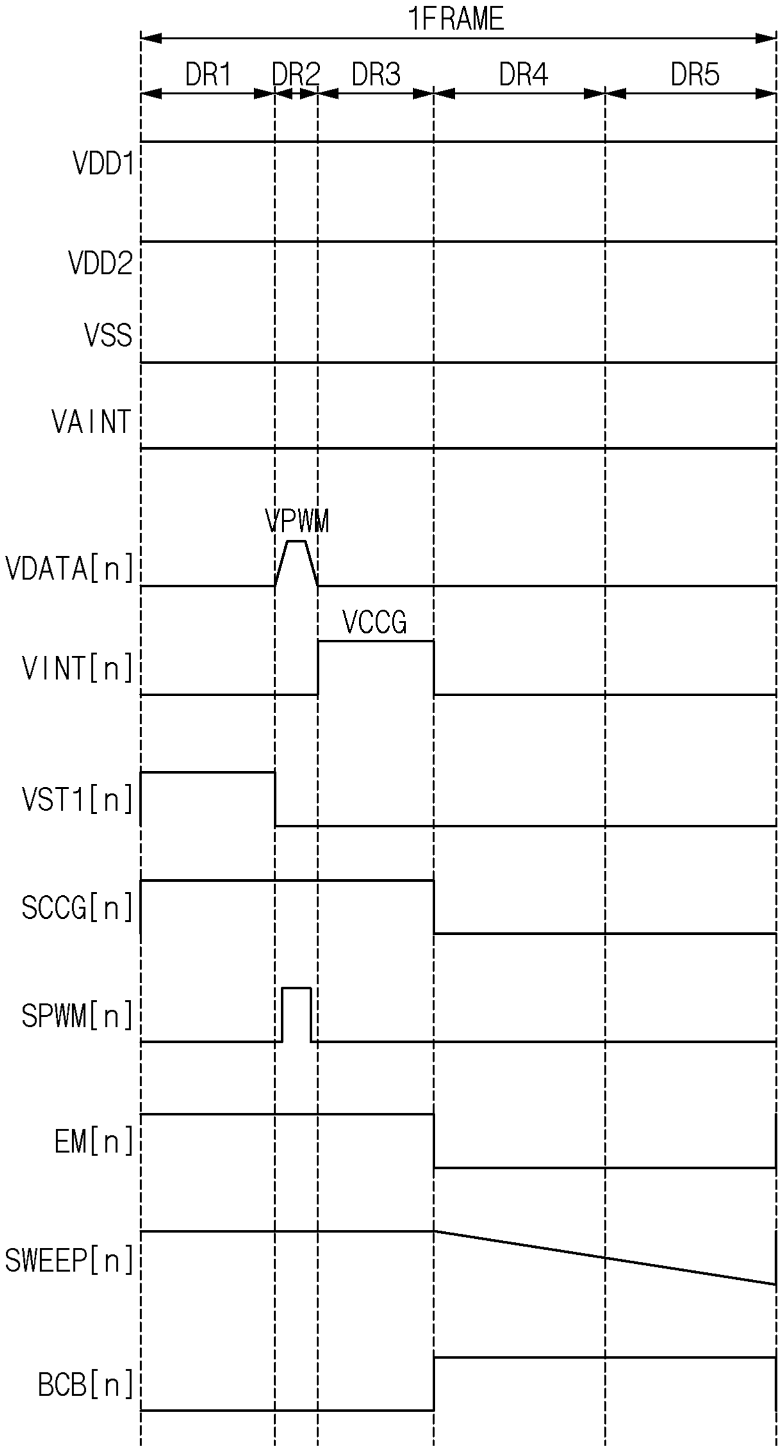
FIG. 18 is a timing diagram illustrating an example of input signals applied to the pixel circuit of FIG. 2 and node signals of the pixel circuit of FIG. 2.

FIG. 18 is a timing diagram illustrating an example of input signals applied to the pixel circuit of FIG. 2 and node signals of the pixel circuit of FIG. 2.

The driving timing of the pixel circuit according to the present embodiments is the same (or substantially the same) as the driving timing of the previous embodiments explained referring to FIGS. 4, 6, 8, 10 and 12 except that the display panel is driven in a progressive light emission driving method. Thus, the same reference numerals will be used to refer to the same or like parts as those described in the previous embodiments and any repetitive explanation concerning the above elements will be omitted.

Referring to FIGS. 1, 2 and 18, the display panel 100 may be driven in a progressive light emission driving method.

In a driving timing, a first period DR1 may be an initialization period, a second period DR2 may be a pulse width modulation data writing and compensation period, a third period DR3 may be a constant-current voltage writing period, a fourth period DR4 may be a light emission period and a fifth period DR5 may be a light emission off period.

According to some embodiments, the first initialization signal VST1[n], the second initialization signal BCB[n], the first scan signal SPWM[n], the second scan signal SCCG[n], the emission signal EM[n] and the sweep signal SWEEP[n] may be progressive scan signals having different timings for pixel rows. Herein,[n] may represent an n-th pixel row.

The first initialization signal VST1[n], the second initialization signal BCB[n], the first scan signal SPWM[n], the second scan signal SCCG[n], the emission signal EM[n] and the sweep signal SWEEP[n] may be progressively applied to the pixel rows.

In addition, the voltage VDATA[n] of the data voltage terminal and the voltage VINT[n] of the first initialization voltage terminal may be progressively applied to the pixel rows.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

In addition, according to some embodiments, the pixel circuit may be driven in the progressive light emission driving method.

Figure 19:
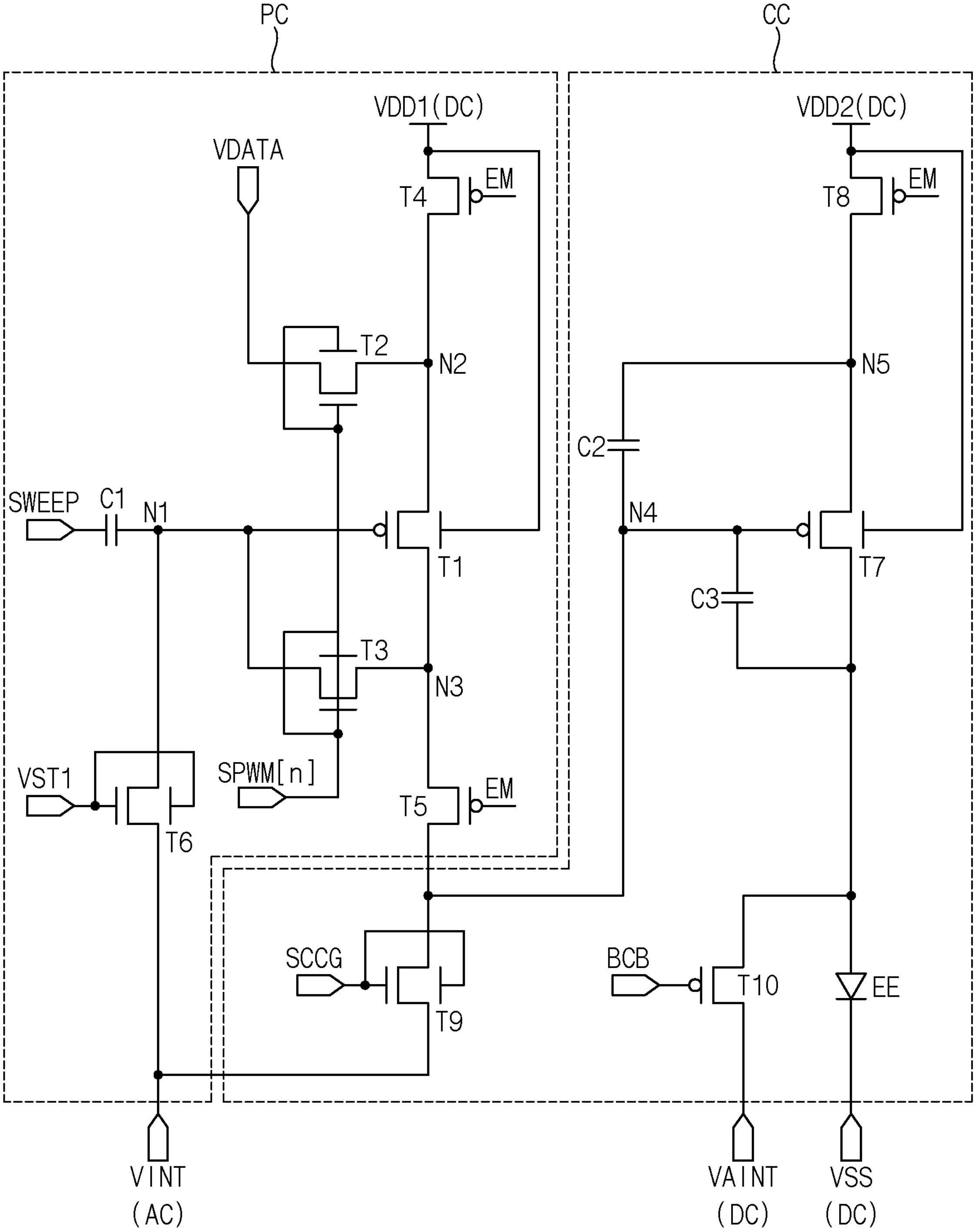
FIG. 19 is a circuit diagram illustrating a pixel circuit of a display panel of a display apparatus according to some embodiments of the present disclosure.

FIG. 19 is a circuit diagram illustrating a pixel circuit of a display panel 100 of a display apparatus according to some embodiments of the present disclosure. Although FIG. 19 illustrates various components in a first circuit PC and a second circuit CC according to some embodiments of the present disclosure, embodiments are not limited thereto, and according to various embodiments, the first circuit and the second circuit may include additional components or fewer components without departing from the spirit and scope of embodiments according to the present disclosure.

The pixel circuit according to the present embodiments is the same (or substantially the same) as the pixel circuit of the previous embodiments explained referring to FIG. 2 except that some of the transistors of the pixel circuit further include a second control electrode. Thus, the same reference numerals will be used to refer to the same or like parts as those described in the previous embodiments and some repetitive explanation concerning the above elements may be omitted.

Referring to FIGS. 1, 3 to 12 and 19, the pixel circuit includes the first transistor T1, the second transistor T2, the third transistor T3, the seventh transistor T7, the ninth transistor T9, a third capacitor C3 and the light emitting element EE. The first transistor T1 includes a control electrode connected to a first node N1, a first electrode connected to a second node N2 and a second electrode connected to a third node N3. The second transistor T2 applies a data voltage (VPWM of FIG. 4) to the first transistor T1. The third transistor T3 is connected to the first node N1 and the third node N3. The seventh transistor T7 is connected to a fourth node N4 and applies a driving current to the light emitting element EE. The ninth transistor T9 applies a constant-current voltage (VCCG of FIG. 4) to the fourth node N4. The third capacitor C3 includes a first electrode connected to the fourth node N4 and a second electrode connected to an anode electrode of the light emitting element EE. The light emitting element EE emits a light based on the data voltage (VPWM of FIG. 4) and the constant-current voltage (VCCG of FIG. 4).

The first transistor T1 is a P-type transistor. The seventh transistor T7 is a P-type transistor. The second transistor T2 is an N-type transistor. The third transistor T3 is an N-type transistor.

According to some embodiments, the first transistor T1 may further include a second control electrode receiving the first power voltage VDD1. When a charge of the first transistor T1 is biased in one direction, and a charge imbalance occurs, a stain may occur on the display panel 100 due to the charge imbalance of the first transistor T1. When the first transistor T1 further includes the second control electrode receiving the first power voltage VDD1, the stain of the display panel 100 may be prevented or reduced due to the charge imbalance.

According to some embodiments, the seventh transistor T7 may further include a second control electrode receiving the second power voltage VDD2. When the seventh transistor T7 further includes the second control electrode receiving the second power voltage VDD2, the stain of the display panel 100 may be prevented or reduced due to the charge imbalance.

According to some embodiments, the second transistor T2 may further include a second control electrode connected to the control electrode of the second transistor T2. Thus, a mobility of the second transistor T2 may be enhanced.

According to some embodiments, the third transistor T3 may further include a second control electrode connected to the control electrode of the third transistor T3. Thus, a mobility of the third transistor T3 may be enhanced.

According to some embodiments, the sixth transistor T6 may further include a second control electrode connected to the control electrode of the sixth transistor T6. Thus, a mobility of the sixth transistor T6 may be enhanced.

According to some embodiments, the ninth transistor T9 may further include a second control electrode connected to the control electrode of the ninth transistor T9. Thus, a mobility of the ninth transistor T9 may be enhanced.

According to some embodiments, the pixel circuit may include ten transistors and three capacitors. The pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be relatively reduced.

In addition, the constant current generating circuit includes the third capacitor C3 operating a threshold voltage compensation of the constant current generating circuit so that the number of the transistors may be relatively reduced.

In addition, the driving transistor T1 of the pulse width modulation circuit PC and the driving transistor T7 of the constant current generating circuit CC are P-type transistors so that a mobility may be enhanced.

In addition, the initialization voltage VAINT for initializing the anode electrode of the light emitting element EE is less than the power voltage VSS2 applied to the cathode electrode of the light emitting element EE so that a black characteristic of the pixel circuit may be enhanced.

In addition, the first initialization voltage applied to the control electrode of the first transistor T1 and the constant-current voltage VCCG applied to the control electrode of the seventh transistor T7 are outputted from the same voltage terminal so that a number of transistors and a number of signal lines may be relatively reduced.

Figure 20:
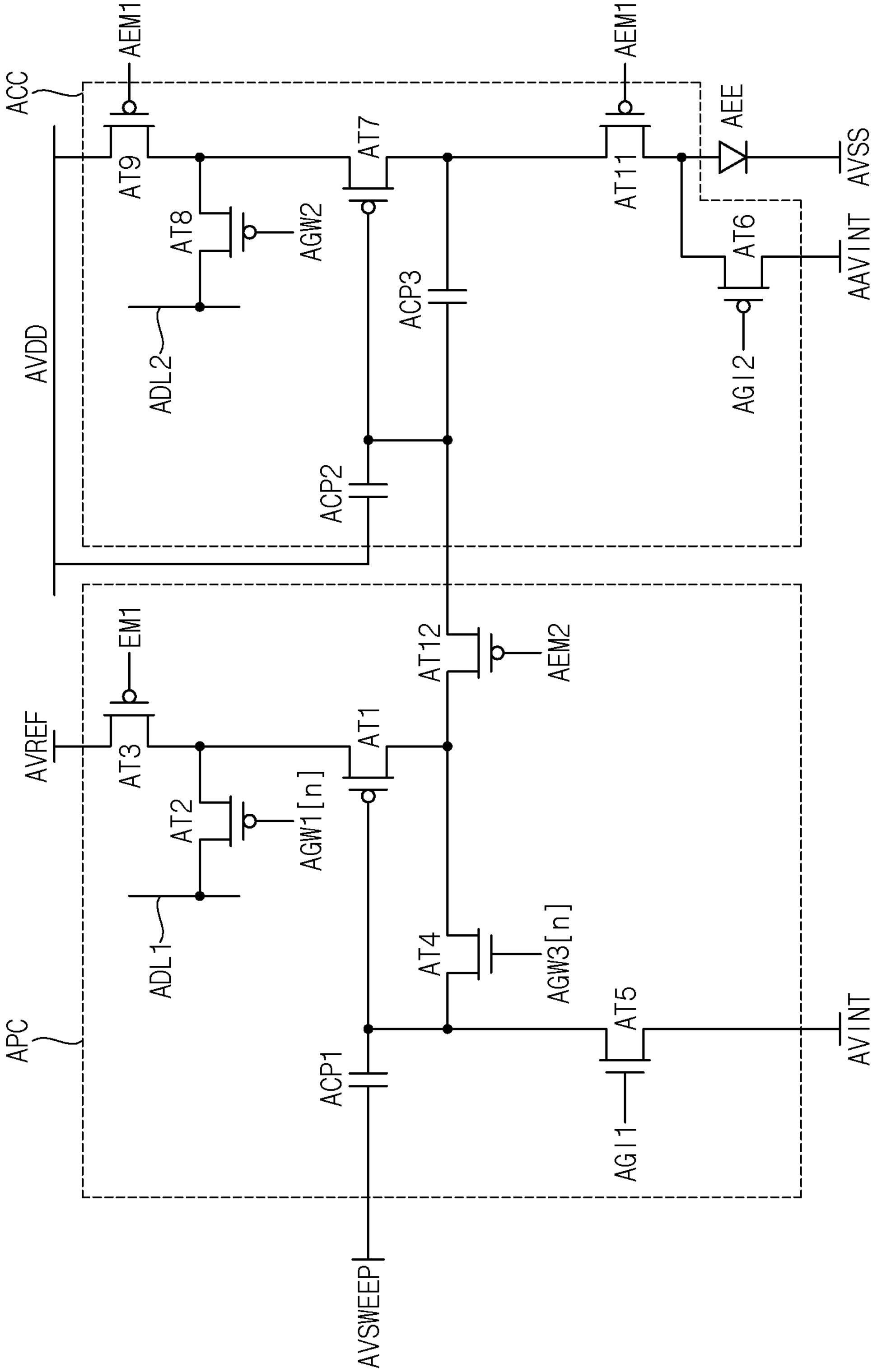
FIG. 20 is a circuit diagram illustrating a pixel circuit of a display panel of a display apparatus according to some embodiments of the present disclosure.

FIG. 20 is a circuit diagram illustrating a pixel circuit of a display panel of a display apparatus according to some embodiments of the present disclosure. Although FIG. 20 illustrates various components in a pixel circuit according to some embodiments of the present disclosure, embodiments are not limited thereto, and according to various embodiments, the pixel circuit may include additional components or fewer components without departing from the spirit and scope of embodiments according to the present disclosure.

Figure 21:
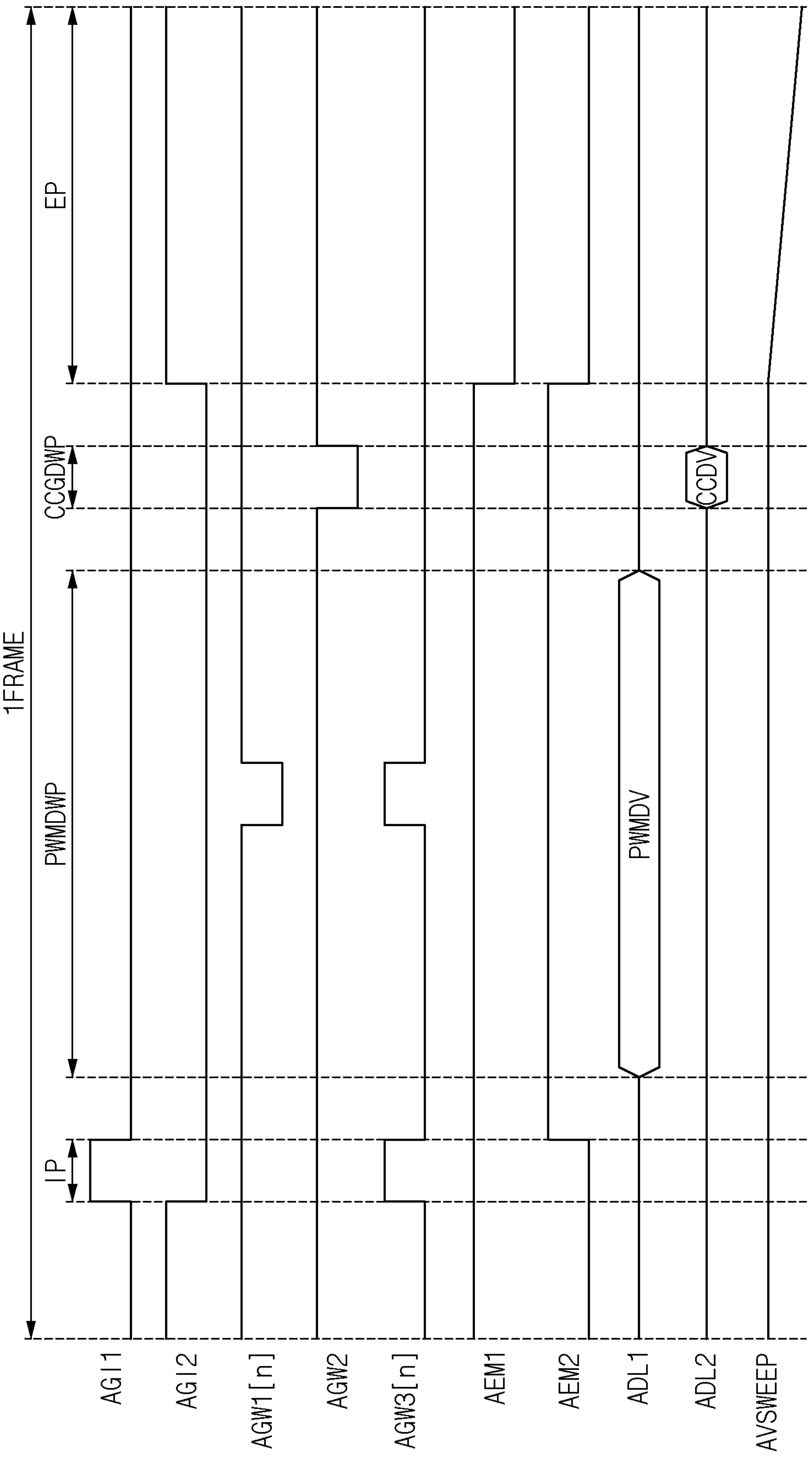
FIG. 21 is a timing diagram illustrating an example of input signals applied to the pixel circuit of FIG. 20 and node signals of the pixel circuit of FIG. 20.

FIG. 21 is a timing diagram illustrating an example of input signals applied to the pixel circuit of FIG. 20 and node signals of the pixel circuit of FIG. 20.

Referring to FIGS. 1, 20 and 21, a pixel circuit according to some embodiments may include a PWM circuit APC, a CCG circuit ACC and a light emitting element AEE. According to some embodiments, the PWM circuit APC may include a first transistor AT1, a second transistor AT2, a third transistor AT3, a fourth transistor AT4, a fifth transistor AT5, a twelfth transistor AT12 and a first capacitor ACP1, the CCG circuit ACC may include a sixth transistor AT6, a seventh transistor AT7, an eighth transistor AT8, a ninth transistor AT9, an eleventh transistor AT11, a second capacitor ACP2 and a third capacitor ACP3.

The first transistor AT1 may be turned on in response to a sweep voltage AVSWEEP applied by coupling of the first capacitor ACP1. Further, a turn-on time point of the first transistor AT1 may be determined according to a voltage level of a PWM data voltage. According to some embodiments, the first transistor AT1 may include a gate connected to the first capacitor ACP1, a first terminal connected to the second and third transistors AT2 and AT3, and a second terminal connected to the fourth and twelfth transistors AT4 and AT12.

The second transistor AT2 may transfer the PWM data voltage of a first data line ADL1 to the first terminal of the first transistor AT1 in response to a first writing signal AGW1[n]. According to some embodiments, the first writing signal AGW1[n] may be sequentially applied to a plurality of pixel circuits of a display panel on a row-by-row basis. Further, according to some embodiments, the second transistor AT2 may include a gate for receiving the first writing signal AGW1[n], a first terminal connected to the first data line ADL1, and a second terminal connected to the first terminal of the first transistor AT1.

The third transistor AT3 may transfer a reference voltage AVREF to the first terminal of the first transistor AT1 in response to a first emission signal AEM1. According to some embodiments, the first emission signal AEM1 may be simultaneously or concurrently (or substantially simultaneously or substantially concurrently) applied to the plurality of pixel circuits in two or more rows. For example, the first emission signal AEM1 may be simultaneously or concurrently (or substantially simultaneously or substantially concurrently) applied to all pixel circuits of the display panel. Further, according to some embodiments, the third transistor AT3 may include a gate for receiving the first emission signal AEM1, a first terminal connected to a line for transferring the reference voltage AVREF, and a second terminal connected to the first terminal of the first transistor AT1.

The fourth transistor AT4 may diode-connect the first transistor AT1 in response to a third writing signal AGW3[n]. According to some embodiments, the third writing signal AGW3[n] may be sequentially applied to the plurality of pixel circuits of the display panel on a row-by-row basis. Further, according to some embodiments, the fourth transistor AT4 may include a gate for receiving the third writing signal AGW3[n], a first terminal connected to the second terminal of the first transistor AT1, and a second terminal connected to the gate of the first transistor AT1.

The fifth transistor AT5 may transfer an initialization voltage AVINT to the gate of the first transistor AT1 in response to a first initialization signal AGI1. In addition, the initialization voltage AVINT applied to the gate of the first transistor AT1 may be further applied to a gate of the seventh transistor AT7 through the fourth and twelfth transistors AT4 and AT12. According to some embodiments, the first initialization signal AGI1 may be simultaneously or concurrently (or substantially simultaneously or substantially concurrently) applied to the plurality of pixel circuits arranged in two or more rows. For example, the first initialization signal AGI1 may be simultaneously or concurrently (or substantially simultaneously or substantially concurrently) applied to all pixel circuits of the display panel. Further, according to some embodiments, the fifth transistor AT5 may include a gate for receiving the first initialization signal AGI1, a first terminal connected to a line for transferring the initialization voltage AVINT, and a second terminal connected to the gate of the first transistor AT1.

The first capacitor ACP1 may be connected between a line for transferring the sweep voltage AVSWEEP and the gate of the first transistor AT1. According to some embodiments, the first capacitor ACP1 may include a first electrode connected to the line for transferring the sweep voltage AVSWEEP, and a second electrode connected to the gate of the first transistor AT1.

The sixth transistor AT6 may transfer an anode initialization voltage AAVINT to an anode of the light emitting element AEE in response to a second initialization signal AGI2. According to some embodiments, the second initialization signal AGI2 may be simultaneously or concurrently (or substantially simultaneously or substantially concurrently) applied to the plurality of pixel circuits arranged in two or more rows. For example, the second initialization signal AGI2 may be simultaneously or concurrently (or substantially simultaneously or substantially concurrently) applied to all pixel circuits of the display panel. According to some embodiments, the initialization voltage AVINT for initializing the gates of the first and seventh transistors AT1 and AT7 and the anode initialization voltage AAVINT for initializing the anode of the light emitting element AEE may be the same voltage transferred through the same line. According to some embodiments, the anode initialization voltage AAVINT for initializing the anode of the light emitting element AEE may be different from the initialization voltage AVINT for initializing the gates of the first and seventh transistors AT1 and AT7. Further, according to some embodiments, the sixth transistor AT6 may include a gate for receiving the second initialization signal AGI2, a first terminal connected to a line for transferring the anode initialization voltage AAVINT, and a second terminal connected to the anode of the light emitting element AEE.

The seventh transistor AT7 may generate a constant (or fixed) driving current based on a constant current data voltage of a second data line ADL2. According to some embodiments, the seventh transistor AT7 may include a gate connected to the second capacitor ACP2, a first terminal connected to the eighth and ninth transistors AT8 and AT9, and a second terminal connected to the eleventh transistor T11.

The eighth transistor AT8 may transfer the constant current data voltage of the second data line ADL2 to the first terminal of the seventh transistor AT7 in response to a second writing signal AGW2. According to some embodiments, the second writing signal AGW2 may be simultaneously or concurrently (or substantially simultaneously or substantially concurrently) applied to the plurality of pixel circuits in two or more rows. For example, the second writing signal AGW2 may be simultaneously or oncurrently (or substantially simultaneously or substantially concurrently) applied to all pixel circuits of the display panel. Further, according to some embodiments, as illustrated in FIG. 20, the first and second data lines ADL1 and ADL2 may be different data lines. According to some embodiments, the eighth transistor AT8 may include a gate for receiving the second writing signal AGW2, a first terminal connected to the second data line ADL2, and a second terminal connected to the first terminal of the seventh transistor AT7.

The ninth transistor AT9 may transfer a first power supply voltage VDD to the first terminal of the seventh transistor AT7 in response to the first emission signal AEM1. According to some embodiments, the ninth transistor AT9 may include a gate for receiving the first emission signal AEM1, a first terminal connected to a line for transferring the first power supply voltage AVDD, and a second terminal connected to the first terminal of the seventh transistor AT7.

The third capacitor ACP3 may include a first electrode connected to the gate of the seventh transistor AT7 and a second electrode connected to the second terminal of the seventh transistor AT7. The third capacitor ACP3 of FIG. 20 may compensate the threshold voltage of the seventh transistor AT7 like the third capacitor C3 of FIG. 2.

The eleventh transistor AT11 may connect the second terminal of the seventh transistor AT7 to the anode of the light emitting element AEE in response to the first emission signal AEM1. According to some embodiments, the eleventh transistor AT11 may include a gate for receiving the first emission signal AEM1, a first terminal connected to the second terminal of the seventh transistor AT7, and a second terminal connected to the anode of the light emitting element AEE.

The second capacitor ACP2 may be connected between the line for transferring the first power supply voltage AVDD and the gate of the seventh transistor AT7. According to some embodiments, the second capacitor ACP2 may include a first electrode connected to the line for transferring the first power supply voltage AVDD, and a second electrode connected to the gate of the seventh transistor AT7.

The twelfth transistor AT12 may connect the PWM circuit APC to the CCG circuit ACC in response to a second emission signal AEM2. For example, the twelfth transistor AT12 may connect the second terminal of the first transistor AT1 to the gate of the seventh transistor AT7. According to some embodiments, the second emission signal AEM2 may be simultaneously or concurrently (or substantially simultaneously or substantially concurrently) applied to a plurality of pixel circuits in two or more rows. For example, the second emission signal AEM2 may be simultaneously or concurrently (or substantially simultaneously or substantially concurrently) applied to all pixel circuits of the display panel. Further, according to some embodiments, the twelfth transistor AT12 may include a gate for receiving the second emission signal AEM2, a first terminal connected to the second terminal of the first transistor AT1, and a second terminal connected to the gate of the seventh transistor AT7.

The light emitting element AEE may emit light based on the constant driving current. For example, the light emitting element AEE may be a micro light emitting diode, an organic light emitting diode, a nano light emitting diode, a quantum dot light emitting diode, an inorganic light emitting diode, or any other suitable light emitting element. According to some embodiments, the light emitting element AEE may include an anode connected to the sixth and eleventh transistors AT6 and AT11, and a cathode connected to a line for transferring a second power supply voltage AVSS.

According to some embodiments, the pixel circuit may include at least one P-type metal oxide semiconductor (PMOS) transistor and at least one N-type metal oxide semiconductor (NMOS) transistor, but is not limited thereto. For example, as illustrated in FIG. 20, the first, second, third, sixth, seventh, eighth, ninth, eleventh and twelfth transistors AT1, AT2, AT3, AT6, AT7, AT8, AT9, AT11 and AT12 may be PMOS transistors, and the fourth and fifth transistors T4 and T5 may be NMOS transistors.

A frame period 1FRAME for a display apparatus including a pixel circuit may include an initialization period IP in which gates of first transistors AT1 of a plurality of pixel circuits of a display panel and gates of seventh transistors AT7 of the plurality of pixel circuits are simultaneously or concurrently (or substantially simultaneously or substantially concurrently) initialized, a PWM data writing period PWMDWP in which PWM data voltages PWMDV are sequentially written to the plurality of pixel circuits on a row-by-row basis, a CCG data writing period CCGDWP in which a constant current data voltage is simultaneously or concurrently (or substantially simultaneously or substantially concurrently) written to the plurality of pixel circuits, and an emission period EP in which light emitting elements AEE of the plurality of pixel circuits may simultaneously or concurrently (or substantially simultaneously or substantially concurrently) start emitting light.

In the initialization period IP, a first initialization signal AGI1, a second initialization signal AGI2, a third writing signal AGW3[n] and a second emission signal AEM2 may have an on-level. For example, in the initialization period IP, all of the third writing signals AGW3[n] applied to the plurality of pixel circuits may have the on-level. The fifth transistor AT5 may be turned on in response to the first initialization signal AGI1, and may transfer an initialization voltage AVINT to a gate of the first transistor AT1. Thus, the gate of the first transistor AT1 may be initialized based on the initialization voltage AVINT. Further, the fourth transistor AT4 may be turned on in response to the third writing signal AGW3[n], the twelfth transistor AT12 may be turned on in response to the second emission signal AEM2, and thus the initialization voltage AVINT may be further applied to a gate of the seventh transistor AT7 through the fifth transistor AT5, the fourth transistor AT4 and the twelfth transistor AT12. Accordingly, the gate of the seventh transistor AT7 also may be initialized based on the initialization voltage AVINT. Further, the sixth transistor AT6 may be turned on in response to the second initialization signal AGI2, and may transfer the anode initialization voltage AAVINT to the anode of the light emitting element AEE. Thus, the anode of the light emitting element AEE may be initialized based on the anode initialization voltage AAVINT.

In the PWM data write period PWMDWP, first and third writing signals AGW1[n] and AGW3[n] for the plurality of pixel circuits of the display panel may sequentially have the on-level on a row-by-row basis. While the first and third writing signals AGW1[n] and AGW3[n] for the pixel circuit have the on-level, a second transistor AT2 may be turned on in response to the first writing signal AGW1[n], and the fourth transistor AT4 may be turned on in response to the third writing signal AGW3[n]. The second transistor AT2 may transfer the PWM data voltage of a first data line ADL1 to a first terminal of the first transistor AT1, and the fourth transistor AT4 may diode-connect the first transistor AT1. Thus, the PWM data voltage may be applied to a second electrode of a first capacitor ACP1 through the diode-connected first transistor AT1, and the gate of the first transistor AT1, or the second electrode of the first capacitor ACP1 may have a voltage corresponding to a sum of the PWM data voltage and a threshold voltage of the first transistor AT1. This operation may be referred to as a threshold voltage compensation operation for the first transistor AT1. Further, in the PWM data writing period PWMDWP, the second initialization signal AGI2 may have the on-level, the sixth transistor AT6 may transfer the anode initialization voltage AAVINT to the anode of the light emitting element AEE in response to the second initialization signal AGI2, and the anode of the light emitting element AEE may be initialized based on the anode initialization voltage AAVINT.

In the CCG data write period CCGDWP, a second writing signal AGW2 and a fourth writing signal AGW4 may have the on-level. The eighth transistor AT8 may be turned on in response to the second writing signal AGW2. The eighth transistor AT8 may transfer the constant current data voltage of a second data line ADL2 to a first terminal of the seventh transistor AT7. Further, in the CCG data writing period CCGDWP, the second initialization signal AGI2 may have the on-level, the sixth transistor AT6 may transfer the anode initialization voltage AAVINT to the anode of the light emitting element AEE in response to the second initialization signal AGI2, and the anode of the light emitting element AEE may be initialized based on the anode initialization voltage AAVINT.

In the emission period EP, a first emission signal AEM1 and the second emission signal AEM2 may have the on-level. In each pixel circuit, the ninth and eleventh transistors AT9 and AT11 may be turned on in response to the first emission signal AEM1, and the seventh transistor AT7 may generate a constant (or fixed) driving current based on the voltage at the second electrode of the second capacitor ACP2 corresponding to the sum of the constant current data voltage and the threshold voltage of the seventh transistor AT7. Because the threshold voltage of the seventh transistor AT7 is reflected in the voltage at the second electrode of the second capacitor ACP2, even if the seventh transistors T7 of the plurality of pixel circuits have different threshold voltages, the seventh transistors T7 of the plurality of pixel circuits may generate the constant driving current CDC having the same current level (or substantially the same current level). Thus, the seventh transistors T7 of the plurality of pixel circuits may simultaneously or concurrently (or substantially simultaneously or substantially concurrently) start providing the same constant driving current to the light emitting elements AEE of the plurality of pixel circuits at a start time point of the emission period EP, and the light emitting elements AEE of the plurality of pixel circuits may simultaneously or concurrently (or substantially simultaneously or substantially concurrently) start emitting light at the start time point of the emission period EP.

A third transistor AT3 may be turned on in response to the first emission signal AEM1, and the twelfth transistor AT12 may be turned on in response to the second emission signal AEM2. Further, the same sweep voltage AVSWEEP may be provided to the plurality of pixel circuits, and the sweep voltage AVSWEEP may gradually decrease in the emission period EP. In each pixel circuit, the sweep voltage AVSWEEP may be applied to the gate of the first transistor AT1 through the first capacitor ACP1. Thus, as the sweep voltage AVSWEEP gradually decreases, a voltage of the gate of the first transistor AT1 also may gradually decrease from the sum of the PWM data voltage and the threshold voltage of the first transistor AT1. If the voltage of the gate of the first transistor AT1 is gradually decreased by the decrease of the sweep voltage AVSWEEP, the first transistor AT1 may be turned on. Because the threshold voltage of the first transistor AT1 is reflected in the voltage of the gate of the first transistor AT1, even if the first transistors T1 of the plurality of pixel circuits of the display panel have different threshold voltages, a time point at which the first transistor AT1 of each pixel circuit is turned on may not be changed according to the threshold voltage of the first transistor AT1, and may depend on a voltage level of the PWM data voltage applied to the pixel circuit. When the first transistor AT1 is turned on, a reference voltage AVREF may be applied to the gate of the seventh transistor AT7 through the third transistor AT3, the first transistor AT1 and the twelfth transistor AT12, the seventh transistor AT7 may stop providing the constant driving current in response to the reference voltage VREF, and thus the light emitting element AEE may stop emitting light.

As described above, an emission time of each pixel circuit may be determined according to the voltage level of the PWM data voltage applied to the pixel circuit. For example, in a case where a first PWM data voltage having a relatively high voltage level is applied to the pixel circuit, the first transistor AT1 may have a turn-off state until the sweep voltage AVSWEEP reaches a relatively low voltage level. That is, the first transistor AT1 may have the turn-off state for a relatively long first emission time. Thus, in the case where the first PWM data voltage having the relatively high voltage level is applied, during the relatively long first emission time, the seventh transistor AT7 may provide a first constant driving current to the light emitting element AEE, and the light emitting element AEE may emit light based on the first constant driving current. After the first emission time, the first transistor AT1 may be turned on, and the seventh transistor AT7 may be turned off based on the reference voltage VREF. Alternatively, in a case where a second PWM data voltage having a relatively low voltage level is applied to the pixel circuit, the first transistor AT1 may have the turn-off state only until the sweep voltage AVSWEEP reaches a relatively high voltage level. That is, the first transistor AT1 may have the turn-off state for a relatively short second emission time. Thus, in the case where the second PWM data voltage having the relatively low voltage level is applied, during the relatively short second emission time, the seventh transistor AT7 may provide a second constant driving current to the light emitting element AEE, and the light emitting element AEE may emit light based on the second constant driving current. After the second emission time, the first transistor AT1 may be turned on, and the seventh transistor AT7 may be turned off based on the reference voltage VREF. As described above, the emission time of each pixel circuit may be determined according to the voltage level of the PWM data voltage, and thus each pixel circuit may be driven in the PWM method.

According to some embodiments, the pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit APC may be an N-type transistor so that a power consumption may be relatively reduced.

In addition, the constant current generating circuit ACC includes the third capacitor ACP3 operating a threshold voltage compensation of the constant current generating circuit ACC so that the number of the transistors may be relatively reduced.

In addition, the driving transistor AT1 of the pulse width modulation circuit APC and the driving transistor AT7 of the constant current generating circuit ACC are P-type transistors so that a mobility may be enhanced.

Figure 22:
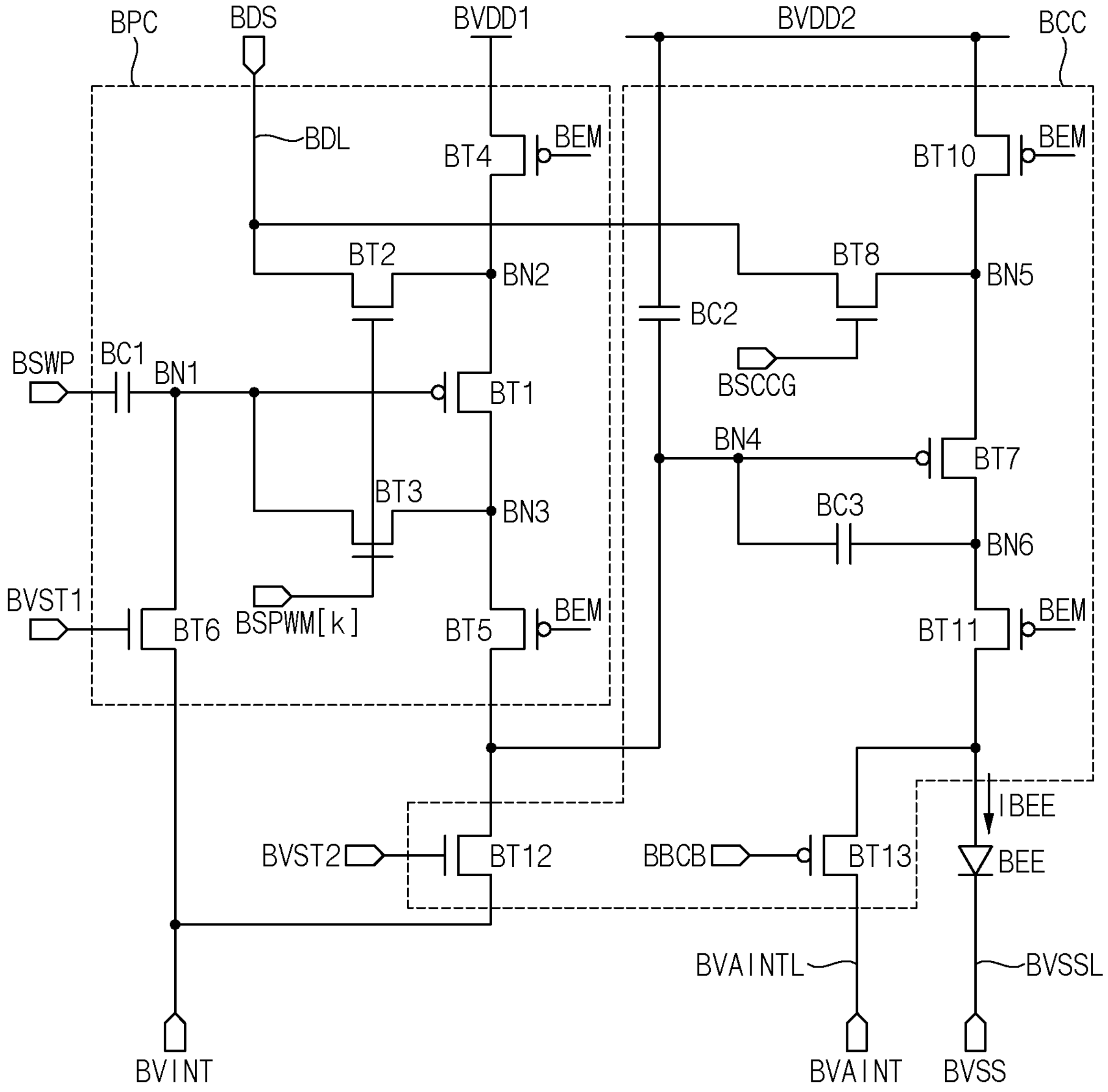
FIG. 22 is a circuit diagram illustrating a pixel circuit of a display panel of a display apparatus according to some embodiments of the present disclosure.

FIG. 22 is a circuit diagram illustrating a pixel circuit of a display panel of a display apparatus according to some embodiments of the present disclosure. Although FIG. 22 illustrates various components in a pixel circuit according to some embodiments of the present disclosure, embodiments are not limited thereto, and according to various embodiments, the pixel circuit may include additional components or fewer components without departing from the spirit and scope of embodiments according to the present disclosure.

Figure 23:
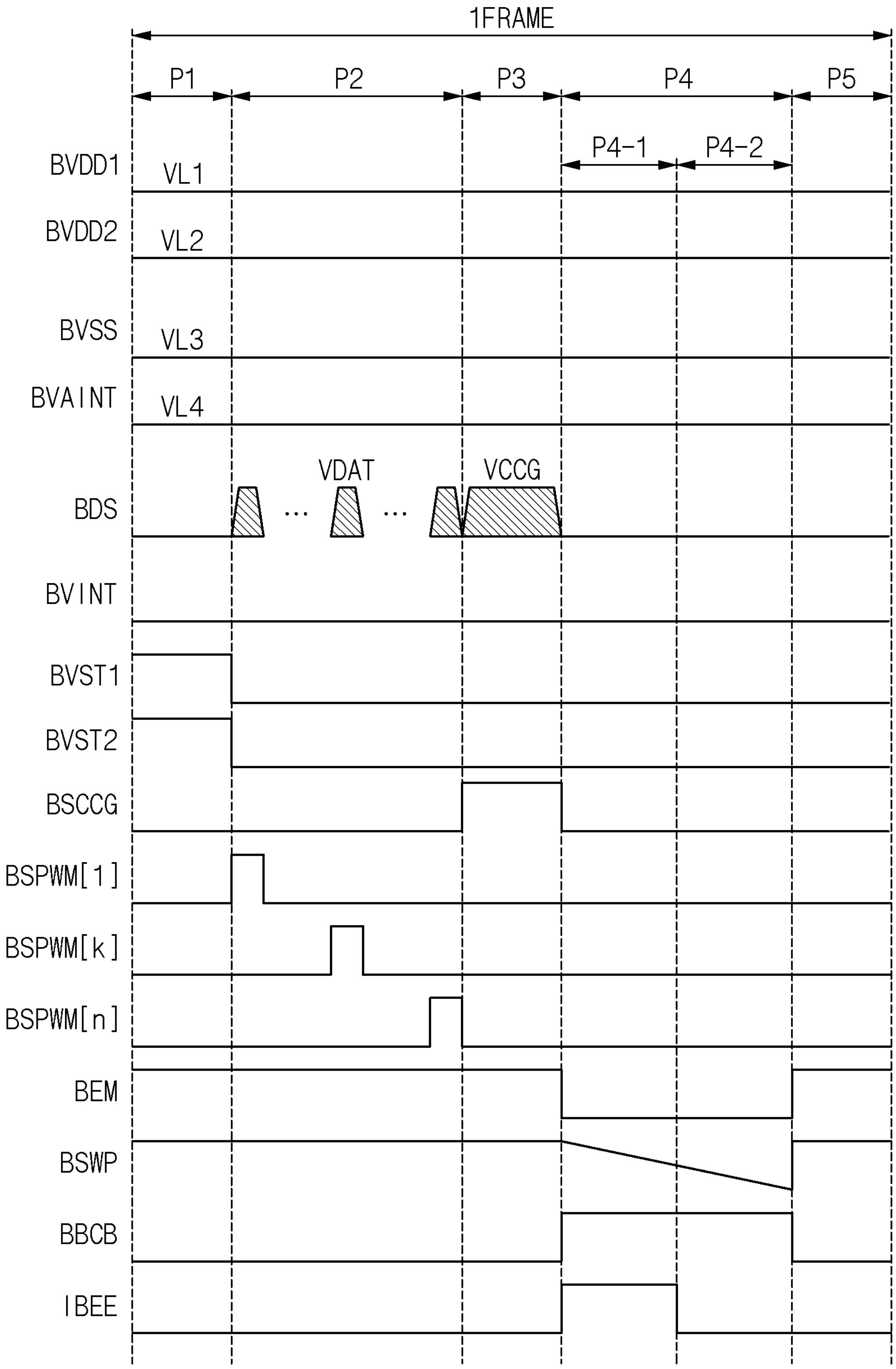
FIG. 23 is a timing diagram illustrating an example of input signals applied to the pixel circuit of FIG. 22 and node signals of the pixel circuit of FIG. 22.

FIG. 23 is a timing diagram illustrating an example of input signals applied to the pixel circuit of FIG. 22 and node signals of the pixel circuit of FIG. 22.

Referring to FIGS. 1, 22 and 23, the pixel circuit may include a light emitting element BEE, a pulse width modulator BPC, and a constant current generator BCC. The light emitting element BEE may emit a light based on a driving current IBEE. The light emitting element BEE may include a first electrode, and a second electrode connected to a low power line BVSSL configured to transmit the low power voltage BVSS.

According to some embodiments, the light emitting element BEE may be a micro-light emitting diode (uLED). The micro-light emitting diode may refer to an ultra-small light emitting diode having a size of 100 micrometers (μm) (or about 100 μm) or less.

The pulse width modulator BPC may control an emission time of the light emitting element BEE based on the data voltage VDAT. The pulse width modulator BPC may include a first driving transistor BT1 (hereinafter referred to as a "first transistor") and at least one N-type transistor (e.g., NMOS transistor) connected to an electrode of the first transistor BT1. Compared to a P-type transistor (e.g., PMOS transistor), an N-type transistor may have a small drain-source voltage, and may have a small off-current. The pulse width modulator BPC may include at least one N-type transistor connected to an electrode of the first transistor BT1, so that the power consumption of the pixel circuit may be relatively reduced.

According to some embodiments, the pulse width modulator BPC may include the first transistor BT1, a first writing transistor BT2 (hereinafter referred to as a "second transistor"), a first compensation transistor BT3 (hereinafter referred to as a "third transistor"), a first emission control transistor BT4 (hereinafter referred to as a "fourth transistor"), a second emission control transistor BT5 (hereinafter referred to as a "fifth transistor"), a first initialization transistor BT6 (hereinafter referred to as a "sixth transistor"), and a first capacitor BC1.

The constant current generator BCC may provide the driving current IBEE having a constant level to the light emitting element BEE based on the constant current generation voltage VCCG. The constant current generator BCC may include a second driving transistor BT7 (hereinafter referred to as a "seventh transistor") and at least one N-type transistor connected to an electrode of the seventh transistor BT7. The constant current generator BCC may include at least one N-type transistor connected to an electrode of the seventh transistor BT7, so that the power consumption of the pixel circuit may be relatively reduced.

According to some embodiments, the constant current generator BCC may include the seventh transistor BT7, a second writing transistor BT8 (hereinafter referred to as an "eighth transistor"), a third emission control transistor BT10 (hereinafter referred to as a "tenth transistor"), a fourth emission control transistor BT11 (hereinafter referred to as an "eleventh transistor"), a second initialization transistor BT12 (hereinafter referred to as a "twelfth transistor"), a bypass transistor BT13 (hereinafter referred to as a "thirteenth transistor"), a second capacitor BC2 and a third capacitor BC3.

The first transistor BT1 may include a gate electrode connected to a first node BN1, a first electrode connected to a second node BN2, and a second electrode connected to a third node BN3. The first transistor BT1 may be turned on based on a voltage difference between the second node BN2 and the first node BN1.

The second transistor BT2 may include a gate electrode configured to receive a scan signal BSPWM[k] corresponding to the pixel circuit, a first electrode connected to a data line BDL configured to transmit the data signal BDS, and a second electrode connected to the second node BN2. The second transistor BT2 may transmit the data voltage VDAT to the second node BN2 in response to the scan signal BSPWM[k] having a turn on voltage level.

The third transistor BT3 may include a gate electrode configured to receive the scan signal BSPWM[k], a first electrode connected to the third node BN3, and a second electrode connected to the first node BN1. The third transistor BT3 may connect the third node BN3 to the first node BN1 in response to the scan signal BSPWM[k] having the turn on voltage level. In other words, the third transistor BT3 may diode-connect the first transistor BT1 in response to the scan signal BSPWM[k] having the turn on voltage level.

The fourth transistor BT4 may include a gate electrode configured to receive the emission control signal BEM, a first electrode configured to receive the first high power voltage BVDD1, and a second electrode connected to the second node BN2. The fourth transistor BT4 may transmit the first high power voltage BVDD1 to the second node BN2 in response to the emission control signal BEM having a turn on voltage level.

The fifth transistor BT5 may include a gate electrode configured to receive the emission control signal BEM, a first electrode connected to the third node BN3, and a second electrode connected to a fourth node BN4. The fifth transistor BT5 may connect the third node BN3 to the fourth node BN4 in response to the emission control signal BEM having the turn on voltage level.

The sixth transistor BT6 may include a gate electrode configured to receive the first initialization gate signal BVST1, a first electrode configured to receive the first initialization voltage BVINT, and a second electrode connected to the first node BN1. The sixth transistor BT6 may transmit the first initialization voltage BVINT to the first node BN1 in response to the first initialization gate signal BVST1 having a turn on voltage level.

The seventh transistor BT7 may include a gate electrode connected to the fourth node BN4, a first electrode connected to a fifth node BN5, and a second electrode connected to a sixth node BN6. The seventh transistor BT7 may generate the driving current IBEE corresponding to a voltage difference between the fifth node BN5 and the fourth node BN4.

The eighth transistor BT8 may include a gate electrode configured to receive the constant current generation scan signal BSCCG, a first electrode connected to the data line BDL, and a second electrode connected to the fifth node BN5. The eighth transistor BT8 may transmit the constant current generation voltage VCCG to the fifth node BN5 in response to the constant current generation scan signal BSCCG having a turn on voltage level.

The third capacitor BC3 may include a first electrode connected to the fourth node BN4 and a second electrode connected to the sixth node BN6. The third capacitor BC3 of FIG. 22 may compensate the threshold voltage of the seventh transistor BT7 like the third capacitor C3 of FIG. 2.

The tenth transistor BT10 may include a gate electrode configured to receive the emission control signal BEM, a first electrode configured to receive the second high power voltage BVDD2, and a second electrode connected to the fifth node BN5. The tenth transistor BT10 may transmit the second high power voltage BVDD2 to the fifth node BN5 in response to the emission control signal BEM having the turn on voltage level.

The eleventh transistor BT11 may include a gate electrode configured to receive the emission control signal BEM, a first electrode connected to the sixth node BN6, and a second electrode connected to the first electrode of the light emitting element BEE. The eleventh transistor BT11 may connect the sixth node BN6 to the first electrode of the light emitting element BEE in response to the emission control signal BEM having the turn on voltage level.

The twelfth transistor BT12 may include a gate electrode configured to receive the second initialization gate signal BVST2, a first electrode configured to receive the first initialization voltage BVINT, and a second electrode connected to the fourth node BN4. The twelfth transistor BT12 may transmit the first initialization voltage BVINT to the fourth node BN4 in response to the second initialization gate signal BVST2 having a turn on voltage level.

The thirteenth transistor BT13 may include a gate electrode configured to receive the bypass gate signal BBCB, a first electrode connected to a second initialization voltage line BVAINTL configured to transmit the second initialization voltage BVAINT, and a second electrode connected to the first electrode of the light emitting element BEE. The thirteenth transistor BT13 may transmit the second initialization voltage BVAINT to the first electrode of the light emitting element BEE in response to the bypass gate signal BBCB having a turn on voltage level.

The second initialization voltage line BVAINTL may be separated from the low power line BVSSL.

When the second initialization voltage line BVAINTL is connected to the low power line BVSSL (in other words, when the first electrode of the thirteenth transistor BT13 is connected to the second electrode of the light emitting element BEE), a leakage current flowing through the light emitting element BEE may increase as the light emitting element BEE and the thirteenth transistor BT13 are connected in parallel. The light emitting element BEE may unintentionally emit light due to the leakage current flowing through the light emitting element BEE, and a black display characteristics of the display panel 100 may deteriorate when the display panel 100 displays black.

According to some embodiments, the second initialization voltage line BVAINTL may be separated from the low power line BVSSL, so that a current path from the first electrode of the light emitting element BEE to the second initialization voltage line BVAINTL may be formed through the thirteenth transistor BT13, and accordingly, the leakage current flowing through the light emitting element BEE may be relatively reduced. Accordingly, the black display characteristics of the display panel 100 may be relatively improved.

According to some embodiments, each of the first transistor BT1, the fourth transistor BT4, the fifth transistor BT5, the seventh transistor BT7, the tenth transistor BT10, the eleventh transistor BT11, and the thirteenth transistor BT13 may be a P-type transistor, and each of the second transistor BT2, the third transistor BT3, the sixth transistor BT6, the eighth transistor BT8, and the twelfth transistor BT12 may be an N-type transistor. According to some embodiments, each of the first transistor BT1, the fourth transistor BT4, the fifth transistor BT5, the seventh transistor BT7, the tenth transistor BT10, the eleventh transistor BT11, and the thirteenth transistor BT13 may be a polycrystalline silicon transistor, and each of the second transistor BT2, the third transistor BT3, the sixth transistor BT6, the eighth transistor BT8, the ninth transistor BT9, and the twelfth transistor BT12 may be an oxide semiconductor transistor.

The first capacitor BC1 may include a first electrode configured to receive the sweep signal BSWP, and a second electrode connected to the first node BN1. The first capacitor BC1 may store a voltage of the first node BN1.

The second capacitor BC2 may include a first electrode configured to receive the second high power voltage VDD2, and a second electrode connected to the fourth node BN4. The second capacitor BC2 may store a voltage of the fourth node BN4.

A display scan period BDS may include a first initialization period P1 (hereinafter referred to as a "first period") in which the gate electrode of the first transistor BT1 and the gate electrode of the seventh transistor BT7 are initialized, a first write period P2 (hereinafter referred to as a "second period") in which the data voltage VDAT for which a threshold voltage of the first transistor BT1 is compensated is written to the gate electrode of the first transistor BT1, a second write period P3 (hereinafter referred to as a "third period") in which the constant current generation voltage VCCG for which a threshold voltage of the seventh transistor BT7 is compensated is written to the gate electrode of the seventh transistor BT7, a first emission period P4 (hereinafter referred to as a "fourth period") in which the light emitting element BEE emits a light, and a first bypass period P5 (hereinafter referred to as a "fifth period") in which charges of the light emitting element BEE are discharged. The fourth period P4 may include a fourth-first period P4-1 in which the driving current IBEE having the constant level flows through the light emitting element BEE, and a fourth-second period P4-2 in which the driving current IBEE does not flow through the light emitting element BEE. The periods P1 to P3 and P5 except for the fourth period P4 in the display scan period BDS may be non-emission periods.

The first high power voltage BVDD1, the second high power voltage BVDD2, the low power voltage BVSS, the second initialization voltage BVAINT, the first initialization voltage BVINT, the first initialization gate signal BVST1, the second initialization gate signal BVST2, the constant current generation scan signal BSCCG, the emission control signal BEM, the sweep signal BSWP, and the bypass gate signal BBCB may be commonly provided to the pixel circuits. The scan signals BSPWM[1], . . . , BSPWM[k], . . . , and BSPWM[n] may be sequentially provided to the pixel circuits on a row-by-row basis.

Each of the first high power voltage BVDD1, the second high power voltage BVDD2, the low power voltage BVSS, the second initialization voltage BVAINT, and the first initialization voltage BVINT may be a constant voltage of which voltage level is constant. According to some embodiments, a voltage level VL1 of the first high power voltage BVDD1 is higher than a voltage level VL2 of the second high power voltage BVDD2. For example, the voltage level VL1 of the first high power voltage BVDD1 may be 5.2 V (or about 5.2 V), and the voltage level VL2 of the second high power voltage BVDD2 may be 4.6 V (or about 4.6 V). According to some embodiments, a voltage level VL4 of the second initialization voltage BVAINT is higher than or equal to a voltage level VL3 of the low power voltage BVSS. For example, the voltage level VL3 of the low power voltage BVSS may be −5 V (or about −5 V), and the voltage level VL4 of the second initialization voltage BVAINT may be in a range of −4 V (or about −4 V) to −5 V (or about −5 V).

The data signal BDS may have the data voltage VDAT in the second period P2, and have the constant current generation voltage VCCG in the third period P3.

Each of the first initialization gate signal BVST1 and the second initialization gate signal BVST2 may have a turn on voltage level (e.g., logic high level) in the first period P1, and have a turn off voltage level (e.g., logic low level) in the second to fifth periods P2 to P5.

The constant current generation scan signal BSCCG may have a turn on voltage level (e.g., logic high level) in the third period P3, and have a turn off voltage level (e.g., logic low level) in the first, second, fourth, and fifth periods P1, P2, P4, and P5.

Each of the scan signals BSPWM[1], . . . , BSPWM[k], . . . , and BSPWM[n] may have a turn on voltage level (e.g., logic high level) in the second period P2, and have a turn off voltage level (e.g., logic low level) in the first and third to fifth periods P1 and P3 to P5. The scan signals BSPWM[1], . . . , BSPWM[k], . . . , and BSPWM[n] may be sequentially shifted by a time (e.g., a set or predetermined time) (e.g., one horizontal time).

The emission control signal BEM may have a turn on voltage level (e.g., logic low level) in the fourth period P4, and have a turn off voltage level (e.g., logic high level) in the first to third and fifth periods P1 to P3 and P5.

The sweep signal BSWP may have a high voltage level in the first to third and fifth periods P1 to P3 and P5, and linearly decrease from the high voltage level to a low voltage level in the fourth period P4.

The bypass gate signal BCB may have a turn on voltage level (e.g., logic low level) in the first to third and fifth periods P1 to P3 and P5, and have a turn off voltage level (e.g., logic high level) in the fourth period P4.

According to some embodiments, the pixel circuit may be driven in the pulse width modulation method, operate the internal compensation of the threshold voltage and include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit BPC may be an N-type transistor so that a power consumption may be relatively reduced.

In addition, the constant current generating circuit BCC includes the third capacitor BC3 operating a threshold voltage compensation of the constant current generating circuit BCC so that the number of the transistors may be relatively reduced.

In addition, the driving transistor BT1 of the pulse width modulation circuit BPC and the driving transistor BT7 of the constant current generating circuit BCC are P-type transistors so that a mobility may be enhanced.

Figure 24:
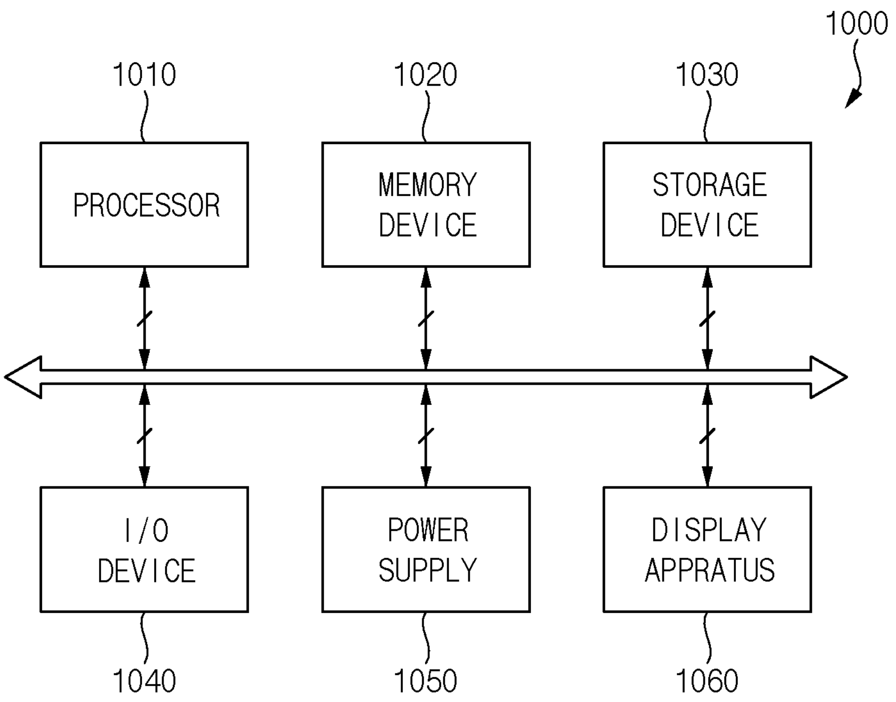
FIG. 24 is a block diagram illustrating an electronic apparatus according to some embodiments of the present disclosure.
Figure 25:
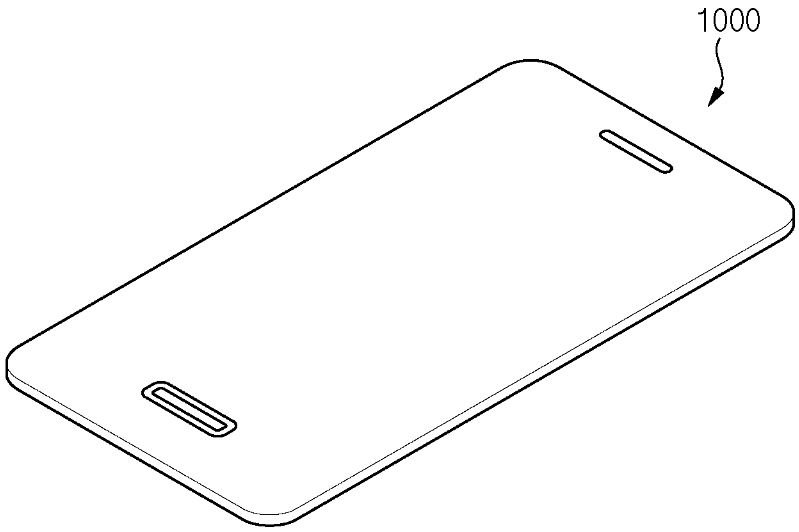
FIG. 25 is a diagram illustrating an example in which the electronic apparatus of FIG. 24 is implemented as a smart phone.

FIG. 24 is a block diagram illustrating an electronic apparatus 1000 according to some embodiments of the present disclosure. FIG. 25 is a diagram illustrating an example in which the electronic apparatus 1000 of FIG. 24 is implemented as a smart phone.

Referring to FIGS. 24 and 25, the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to some embodiments, as illustrated in FIG. 25, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. According to some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 26:
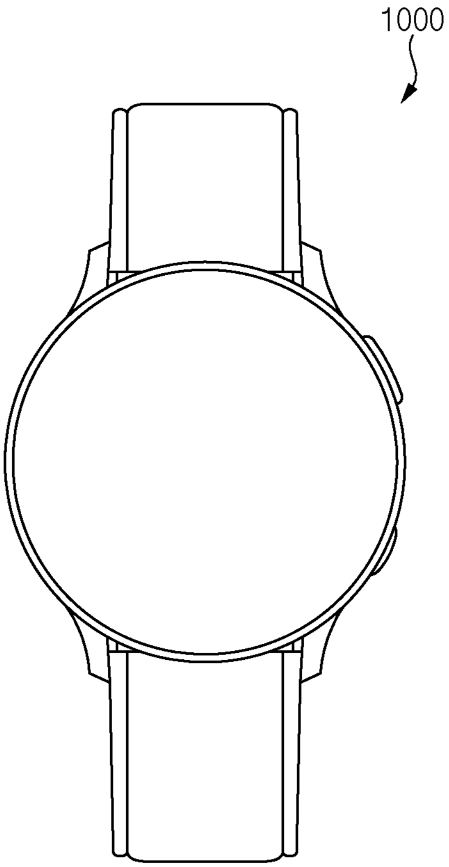
FIG. 26 is a diagram illustrating an example in which the electronic apparatus of FIG. 24 is implemented as a smart watch.

FIG. 26 is a diagram illustrating an example in which the electronic apparatus 1000 of FIG. 24 is implemented as a smart watch.

Referring to FIGS. 24 and 26, the electronic apparatus 1000 may be implemented as a smart watch. The smart watch may be an example of the electronic apparatus 1000 requiring an ultra-high resolution display panel.

According to the pixel circuit and the electronic apparatus of the present disclosure as explained above, the ultra-high resolution display apparatus may be implemented using the pixel circuit having the high integration.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A pixel circuit comprising:

a first transistor including a control electrode connected to a first node, a first electrode connected to a second node, and a second electrode connected to a third node;

a second transistor configured to apply a data voltage to the first transistor;

a third transistor connected to the first node and the third node;

a seventh transistor connected to a fourth node and configured to apply a driving current to a light emitting element;

a ninth transistor configured to apply a constant-current voltage to the fourth node;

a third capacitor including a first electrode connected to the fourth node and a second electrode connected to an anode electrode of the light emitting element; and the light emitting element configured to emit a light based on the data voltage and the constant-current voltage.

2. The pixel circuit of claim 1, further comprising a second capacitor including a first electrode connected to a first electrode of the seventh transistor and a second electrode connected to the fourth node.

3. The pixel circuit of claim 1, further comprising a sixth transistor including a control electrode configured to receive a first initialization signal, a first electrode connected to the first node, and a second electrode connected to a first initialization voltage terminal, wherein the second electrode of the sixth transistor is connected to a second electrode of the ninth transistor.

4. The pixel circuit of claim 1, further comprising a first capacitor including a first electrode configured to receive a sweep signal and a second electrode connected to the first node.

5. The pixel circuit of claim 1, further comprising a tenth transistor including a control electrode configured to receive a second initialization signal, a first electrode connected to the anode electrode of the light emitting element, and a second electrode configured to receive a second initialization voltage.

6. The pixel circuit of claim 1, further comprising an eighth transistor including a control electrode configured to receive an emission signal, a first electrode configured to receive a second power voltage, and a second electrode connected to a first electrode of the seventh transistor.

7. The pixel circuit of claim 1, further comprising:

a fourth transistor including a control electrode configured to receive an emission signal, a first electrode configured to receive a first power voltage, and a second electrode connected to the second node; and a fifth transistor including a control electrode configured to receive the emission signal, a first electrode connected to the third node, and a second electrode connected to the fourth node.

8. The pixel circuit of claim 1, wherein the second transistor includes a control electrode configured to receive a first scan signal, a first electrode configured to receive the data voltage, and a second electrode connected to the second node;

wherein the third transistor includes a control electrode configured to receive the first scan signal, a first electrode connected to the first node, and a second electrode connected to the third node, wherein the seventh transistor includes a control electrode connected to the fourth node, a first electrode connected to a fifth node, and a second electrode connected to the anode electrode of the light emitting element, wherein the ninth transistor includes a control electrode configured to receive a second scan signal, a first electrode connected to the fourth node, and a second electrode connected to a first initialization voltage terminal, and wherein the light emitting element includes the anode electrode and a cathode electrode configured to receive a third power voltage, further comprising:

a fourth transistor including a control electrode configured to receive an emission signal, a first electrode configured to receive a first power voltage, and a second electrode connected to the second node;

a fifth transistor including a control electrode configured to receive the emission signal, a first electrode connected to the third node, and a second electrode connected to the fourth node;

a sixth transistor including a control electrode configured to receive a first initialization signal, a first electrode connected to the first node, and a second electrode connected to the first initialization voltage terminal;

an eighth transistor including a control electrode configured to receive the emission signal, a first electrode configured to receive a second power voltage, and a second electrode connected to the fifth node;

a tenth transistor including a control electrode configured to receive a second initialization signal, a first electrode connected to the anode electrode of the light emitting element, and a second electrode configured to receive a second initialization voltage;

a first capacitor including a first electrode configured to receive a sweep signal and a second electrode connected to the first node; and a second capacitor including a first electrode connected to the fifth node and a second electrode connected to the fourth node.

9. The pixel circuit of claim 8, wherein the second transistor, the third transistor, the sixth transistor, and the ninth transistor are N-type transistors, and wherein the first transistor, the fourth transistor, the fifth transistor, the seventh transistor, the eighth transistor, and the tenth transistor are P-type transistors.

10. The pixel circuit of claim 8, wherein the first transistor further includes a second control electrode configured to receive the first power voltage, wherein the second transistor further includes a second control electrode connected to the control electrode of the second transistor, wherein the third transistor further includes a second control electrode connected to the control electrode of the third transistor, wherein the sixth transistor further includes a second control electrode connected to the control electrode of the sixth transistor, wherein the seventh transistor further includes a second control electrode configured to receive the second power voltage, and wherein the ninth transistor further includes a second control electrode connected to the control electrode of the ninth transistor.

11. The pixel circuit of claim 8, wherein the first initialization signal has an active level in a first period, wherein the second initialization signal has an active level in the first period, wherein the first scan signal has an inactive level in the first period, wherein the second scan signal has an active level in the first period, wherein the emission signal has an inactive level in the first period, wherein the sweep signal has a high level in the first period, and wherein a voltage outputted from the first initialization voltage terminal has a first level in the first period.

12. The pixel circuit of claim 8, wherein the first initialization signal has an inactive level in a second period, wherein the second initialization signal has an active level in the second period, wherein the first scan signal has an active pulse in the second period, wherein the second scan signal has an active level in the second period, wherein the emission signal has an inactive level in the second period, and wherein the sweep signal has a high level in the second period.

13. The pixel circuit of claim 8, wherein the first initialization signal has an inactive level in a third period, wherein the second initialization signal has an active level in the third period, wherein the first scan signal has an inactive level in the third period, wherein the second scan signal has an active level in the third period, wherein the emission signal has an inactive level in the third period, wherein the sweep signal has a high level in the third period, and wherein a voltage outputted from the first initialization voltage terminal has a second level in the third period.

14. The pixel circuit of claim 8, wherein the first initialization signal has an inactive level in a fourth period and a fifth period, wherein the second initialization signal has an inactive level in the fourth period and the fifth period, wherein the first scan signal has an inactive level in the fourth period and the fifth period, wherein the second scan signal has an inactive level in the fourth period and the fifth period, wherein the emission signal has an active level in the fourth period and the fifth period, and wherein the sweep signal is configured to gradually decrease from a high level in the fourth period and the fifth period.

15. The pixel circuit of claim 8, wherein the second scan signal has an inactive level in a first period, wherein the second scan signal has the inactive level in a second period subsequent to the first period, and wherein the second scan signal has an active level in a third period subsequent to the second period.

16. The pixel circuit of claim 8, wherein the second scan signal has an active level in a first period, wherein the second scan signal has an inactive level in a second period subsequent to the first period, and wherein the second scan signal has the active level in a third period subsequent to the second period.

17. The pixel circuit of claim 8, wherein the data voltage is applied to the first transistor and the light emitting element emits a light in a writing frame, wherein the first initialization signal has an active level in a first period of the writing frame, wherein the first scan signal has an active pulse in a second period of the writing frame, wherein the data voltage is not applied to the first transistor and the light emitting element emits a light in a holding frame, wherein the first initialization signal has an inactive level in a first period of the holding frame, and wherein the first scan signal has an inactive level in a second period of the holding frame.

18. The pixel circuit of claim 8, wherein the first initialization signal, the second initialization signal, the first scan signal, the second scan signal, the emission signal, and the sweep signal are progressively applied to pixel rows.

19. An electronic apparatus comprising:

a display panel including a pixel circuit;

a data driver configured to output a data voltage to the pixel circuit;

a driving controller configured to control the data driver; and a processor configured to output input image data and an input control signal, wherein the pixel circuit comprises:

a first transistor including a control electrode connected to a first node, a first electrode connected to a second node and a second electrode connected to a third node;

a second transistor configured to apply the data voltage to the first transistor;

a third transistor connected to the first node and the third node;

a seventh transistor connected to a fourth node and configured to apply a driving current to a light emitting element;

a ninth transistor configured to apply a constant-current voltage to the fourth node;

a third capacitor including a first electrode connected to the fourth node and a second electrode connected to an anode electrode of the light emitting element; and the light emitting element configured to emit a light based on the data voltage and the constant-current voltage.

20. The electronic apparatus of claim 19, wherein the electronic apparatus is one of a cellular phone, a video phone, a smart pad, a smart watch, a tablet PC, a car navigation system, a computer monitor, a laptop, or a head mounted display (HMD) device.

* * * * *